United States Patent
Aitken et al.

(10) Patent No.: US 6,268,303 B1
(45) Date of Patent: Jul. 31, 2001

(54) TANTALUM CONTAINING GLASSES AND GLASS CERAMICS

(75) Inventors: Bruce G. Aitken, Corning; George H. Beall, Big Flats; Nicholas F. Borrelli, Elmira; Matthew J. Dejneka, Corning, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/321,035

(22) Filed: May 27, 1999

Related U.S. Application Data
(60) Provisional application No. 60/091,814, filed on Jul. 6, 1998.

(51) Int. Cl.$^7$ .................................................. C03C 3/097
(52) U.S. Cl. ................................ 501/63; 501/64; 501/73; 501/57; 501/56; 428/426; 428/432; 359/341; 359/343; 385/142; 65/385; 65/33.1
(58) Field of Search .................................. 428/426, 432; 501/64, 63, 73, 57, 56; 359/341, 343; 385/142; 65/385, 33.1

(56) References Cited

U.S. PATENT DOCUMENTS

| | | | |
|---|---|---|---|
| 2,920,971 | 1/1960 | Stookey | 106/39 |
| 3,114,066 | 12/1963 | Allen et al. | 313/108 |
| 3,195,030 | 7/1965 | Herczog et al. | 317/258 |
| 3,573,939 | 4/1971 | Beall | 106/39 |

(List continued on next page.)

OTHER PUBLICATIONS

"Chemistry of the Elements", 2nd ed., Greenwood, N.N., Earnshaw, A., 1997, p. 1227 (No Month).*

"Merriam–Webster's Collegiate Dictionary", 10th ed., no date, p. 346 (No Date).*

Poole, S.B. et al. "Fabrication of Low–Loss Optical Fibres Containing Rare–Earth Ions." *Electronics Letters*. Jul. 1985.

Mitachi, S. et al. "Preparation of fluoride optical fibres for transmisison in the mid–infrared." *Physics and Chemistry of Glasses*, vol. 23 No. 6 Dec. 6, 1982, pp. 196–201.

Ito, S. et al. "Transparency of $LiTaO_3$–$SiO_2$–$Al_2O_3$ glass––ceramics in relation to their microstructure." *Journal of Materials Science 13* (1978) 930–938. No Month.

Nassau, Kurt et al. "Quenched Metastable Glassy and Crystalline Phases in the System Lithium–Sodium–Potassium Metatantalate." *Journal of the American Ceramic Society*, vol. 62, No. 1–2, pp. 74–79. (No Date).

*Primary Examiner*—Deborah Jones
*Assistant Examiner*—Wendy Boss
(74) *Attorney, Agent, or Firm*—William Greener; Milton M. Peterson

(57) ABSTRACT

The present invention relates to a glass matrix which includes 4–70 wt. % $SiO_2$, 0.5–20 wt. % $Al_2O_3$, 0–20 wt. % $R_2O$, 0–30 wt. % R'O, 8–85 wt. % $Ta_2O_5$, 0–40 wt. % $Nb_2O_5$, and 0.01–1.0 wt. % $R''_2O_3$, where $R_2O$+R"O is between about 2–35 wt. %, $Ta_2O_5$+$Nb_2O_5$ is between about 8–85 wt. %, R is selected from a group consisting of Li, Na, K, and combinations thereof, R' is selected from a group consisting of Ba, Sr, Ca, Mg, Zn, Pb, and combinations thereof, and R" is a rare earth element. The present invention also relates to use of the glass matrix in forming optic waveguides such as optic amplifiers. The present invention further relates to a transparent glass ceramic that contains pyrochlore, perovskite, or a combination thereof as its major crystal phase, and includes 4–40 wt. % $SiO_2$, 1–15 wt. % $Al_2O_3$, 0–20 wt. % $K_2O$, 0–12 wt. % $Na_2O$, 0–5 wt. % $Li_2O$, 8–85 wt. % $Ta_2O_5$, and 0–45 wt. % $Nb_2O_5$, wherein $Ta_2O_5$+$Nb_2O_5$ is at least about 20 wt. % and ($K_2O$+$Li_2O$+$Na_2O$) is between about 5–20 wt. %. Also disclosed is a method of making the glass ceramic and use of the glass ceramic as a ferro-electric component in electro-optical devices or as a filtering core in an optical filtering device.

34 Claims, 9 Drawing Sheets

U.S. PATENT DOCUMENTS

| | | |
|---|---|---|
| 3,615,757 | 10/1971 | Herczog et al. .................... 106/39 |
| 3,630,765 * | 12/1971 | Araujo . |
| 3,639,771 | 2/1972 | Borrelli et al. .................... 250/225 |
| 3,785,833 | 1/1974 | Rapp .................... 106/39.6 |
| 3,785,834 | 1/1974 | Rapp .................... 106/39.6 |
| 3,984,251 | 10/1976 | Rapp .................... 106/52 |
| 4,017,317 | 4/1977 | Rapp . |
| 4,033,777 | 7/1977 | Young .................... 105/52 |
| 4,047,960 | 9/1977 | Reade .................... 106/39.8 |
| 4,288,250 * | 9/1981 | Yamashita . |
| 4,396,721 | 8/1983 | Lawless .................... 501/10 |
| 4,415,672 | 11/1983 | Brennan . |
| 4,797,889 | 1/1989 | Lempicki .................... 372/39 |
| 4,970,195 | 11/1990 | Bhargava .................... 505/1 |
| 5,173,354 | 12/1992 | Raj .................... 428/209 |
| 5,558,946 | 9/1996 | Nishimoto .................... 428/692 |
| 5,628,883 | 5/1997 | Sugiyama .................... 204/192.32 |
| 5,645,885 | 7/1997 | Nishimoto .................... 427/126.3 |
| 6,128,430 * | 10/2000 | Chu et al. . |

\* cited by examiner

TANTALUM CONTAINING GLASSES AND GLASS CERAMICS

This application claims benefit of provisional application Ser. No. 60/091,814 filed Jun. 6, 1998.

FIELD OF THE INVENTION

The present invention relates to novel tantalum containing glasses and glass ceramics as well as methods of making such glasses and glass ceramics.

BACKGROUND OF THE INVENTION

The increasing demand for improved fiber optic components in telecommunications systems and in medical devices has led to the need for novel glasses. The telecommunications industry utilizes waveguide amplifiers to intensify optical signals that have been attenuated along the length of a fiber optic communication path. Optical communication systems usually operate in two separate bands, namely at about 1300 nm and at about 1550 nm. Typically, these fiber optic components utilize glasses which have been doped with a rare earth element. Doping with rare earth elements generally enables the production of glass materials capable of efficient, low-loss optical transmission and amplification at desired fluorescence bands. For example, erbium has been used as a dopant for amplifiers operating in the 1550 nm band, whereas neodymium, dysprosium, or praseodymium are used as dopants in amplifiers operating in the 1300 nm band. U.S. Pat. No. 3,729,690 to Snitzer describes a glass suitable for use as a laser comprising a host material that contains a fluorescent trivalent neodymium ingredient. U.S. Pat. No. 5,027,079 to Desurvire et al. describes an optical amplifier comprising a single mode fiber that has an erbium-doped core. Also, U.S. Pat. No. 5,239,607 to da Silva et al. describes an apparatus and method for flattening the gain of an optical amplifier that utilizes an erbium-doped silica fiber having a germanosilicate core. U.S. Pat. No. 5,563,979 to Bruce et al. describes an erbium-doped planar optical device whose active core includes a mixture of oxides such as lanthanum and aluminum oxides.

Suitable glasses which may be used in optical components such as those described above must be stable (i.e., resist devitrification). Preferably, the glasses are formed using conventional glass-forming techniques which do not require additional production costs and are compatible with currently available cladding materials. Finally, the glass must possess certain characteristics. One characteristic, as it pertains to use as an optical amplifier, concerns the gain measured against the width of the amplification band (i.e., gain curve). It is preferable for optical amplifiers to have a broader, flatter gain curve. However, many oxide glasses do not display a gain curve which is sufficiently flat (i.e., less than ten percent gain deviation) over a broad amplification band (i.e., greater than 32 nm).

Transparent glass ceramics which exhibit ferro-electric properties are desirable for their use in electro-optical devices of the type disclosed in U.S. Pat. No. 3,069,973 to Ames and U.S. Pat. No. 3,467,463 to Borrelli et al., and acousto-optical devices such as, for example, modulators, laser Q-switches, and/or deflectors. Glass ceramics with sufficiently high dielectric properties at room temperature are also useful in electrical devices such as capacitors, electro-luminescent cells, etc.

Generally, glass ceramics are transparent when their constituent crystalline particles are so small in size that they produce no effective light scattering even at the short wavelengths of the visible spectrum, or when the refractive index difference between the glass phase and crystalline phase is sufficiently small. Because glass ceramics containing ferroelectric crystals generally have crystalline phases with a much higher refractive index than the glass phase thereof, the crystal size becomes the determining factor for transparency of the resulting glass ceramic.

U.S. Pat. No. 3,114,066 to Allen et al. discloses a transparent, high dielectric glass ceramic material comprising 5–25 wt. % $SiO_2$, 50–80 wt. % $Nb_2O_5$, 0–20 wt. % $Na_2O$, and 0–31 wt. % BaO. The crystal lattice formed by the composition of Allen et al. is described as an "oxygen octahedral" lattice. Allen et al. also discloses the substitution of $Na_2O$ and BaO with other modifiers (e.g., oxides of mono-, di-, and tri-valent cations).

U.S. Pat. Nos. 3,785,833, 3,984,251, and 4,017,317 to Rapp disclose various glasses and glass ceramics of the $Na_2O$—$K_2O$—$Nb_2O_5$—$SiO_2$, $Na_2O$—$Ta_2O_5$—$SiO_2$, and $Na_2O$—$Li_2O$—$Ta_2O_5$—$SiO_2$ systems. In particular, the $Na_2O$—$K_2O$—$Nb_2O_5$—$SiO_2$ system includes 23–38 mole % $SiO_2$, 23–47 mole % $Nb_2O_5$, 13–30 mole % $Na_2O$, and 9–22 mole % $K_2O$, where the $Na_2O$ to $K_2O$ ratio is at least 0.7 and the ($Na_2O+K_2O$) to $Nb_2O_5$ ratio is from 0.8 to 1.8. The $Na_2O$—$Ta_2O_5$—$SiO_2$ system includes 37–55 mole % $SiO_2$, 23–35 mole % $Ta_2O_5$, and 20–33 mole % $Na_2O$. The $Na_2O$—Li2O—$Ta_2O_5$—$SiO_2$ system includes 27–45 mole % SiO2, 30–45 mole % $Ta_2O_5$, and 20–35 mole % $Li_2O$+$Na_2O$.

U.S. Pat. No. 3,785,834 to Rapp discloses glasses and glass ceramics of the $R_2O$—$RE_2O_3$—$Nb_2O_5$—GF system, where R is an alkali metal oxide, RE is a rare earth metal oxide (including other trivalent cations), and GF is a glass former, such as $SiO_2$, $GeO_2$, or $P_2O_5$. The composition used to form the glasses and glass ceramics includes 20–45 mole % $SiO_2$, 34–50 mole % $Nb_2O_5$, 7–10 mole % $RE_2O_3$, and 14–20 mole % $R_2O$. The glass ceramics are preferably composed of a crystal phase having crystals with cubic perovskite or tetragonal tungsten-bronze crystal structures.

U.S. Pat. No. 3,573,939 to Beall discloses transparent glass ceramic materials containing 20–55 wt. % $SiO_2$, 2–10 wt.% $Al_2O_3$, 3–6 wt.% $Li_2O$, and 40–70 wt.% $Ta_2O_5$+$Nb_2O_5$, where $Nb_2O_5$ may be up to 10 wt. %. Beall also discloses that such transparent glass ceramics contain a perovskite structure. However, an analysis of these glass systems using conventional X-ray diffraction techniques suggests that the crystal structure is actually ilmenite, not perovskite. The transparency of such $LiTaO_3$—$SiO_2$—$Al_2O_3$ glass ceramics has been shown to be more dependent upon the presence of $Al_2O_3$ than on the ratio of glass forming components (e.g., $SiO_2$) to crystal forming components (e.g., $LiTaO_3$). Ito, S., et al., "Transparency of $LiTaO_3$—$SiO_2$—$Al_2O_3$ Glass-Ceramics in Relation to their Microstructure," *J. Mat. Sci.* 13:930–38 (1978).

The present invention is directed to glasses and glass-ceramics which overcome the above-noted deficiencies in the art.

SUMMARY OF THE INVENTION

The present invention relates to a glass material which includes 4–70 wt. % $SiO_2$, 0.5–20 wt. % $Al_2O_3$, 0–20 wt. % $R_2O$, 0–30 wt. % R'O, 8–85 wt. % $Ta_2O_5$, 0–40 wt. % $Nb_2O_5$, and 0.01–1.0 wt. % R"$_2O_3$, where $R_2O+R'O$ is between about 2–35 wt. %, $Ta_2O_5+Nb_2O_5$ is between about 8–85 wt. %, R is selected from a group consisting of Li, Na, K, and combinations thereof, R' is selected from a group consisting of Ba, Sr, Ca, Mg, Zn, Pb, and combinations thereof, and R" is a rare earth element.

The present invention further relates to a transparent glass ceramic matrix which contains either pyrochlore or perovskite, or a combination thereof, as its major crystal phases and comprises 4–40 wt. % $SiO_2$, 1–15 wt. % $Al_2O_3$, 0–20 wt. % $K_2O$, 0–12 wt. % $Na_2O$, 0–5 wt. % $Li_2O$, 8–85 wt. % $Ta_2O_5$, and 0–45 wt. % $Nb_2O_5$, where $Ta_2O_5+Nb_2O_5$ is at least about 20 wt. % and ($K_2O+Li_2O+Na_2O$) is between about 5–20 wt. %. Another aspect of the present invention relates to a method of making this glass ceramic matrix which includes providing an admixture of the above components and treating the admixture under conditions effective to produce the glass ceramic.

DETAILED DESCRIPTION OF THE INVENTION

Figure 1:
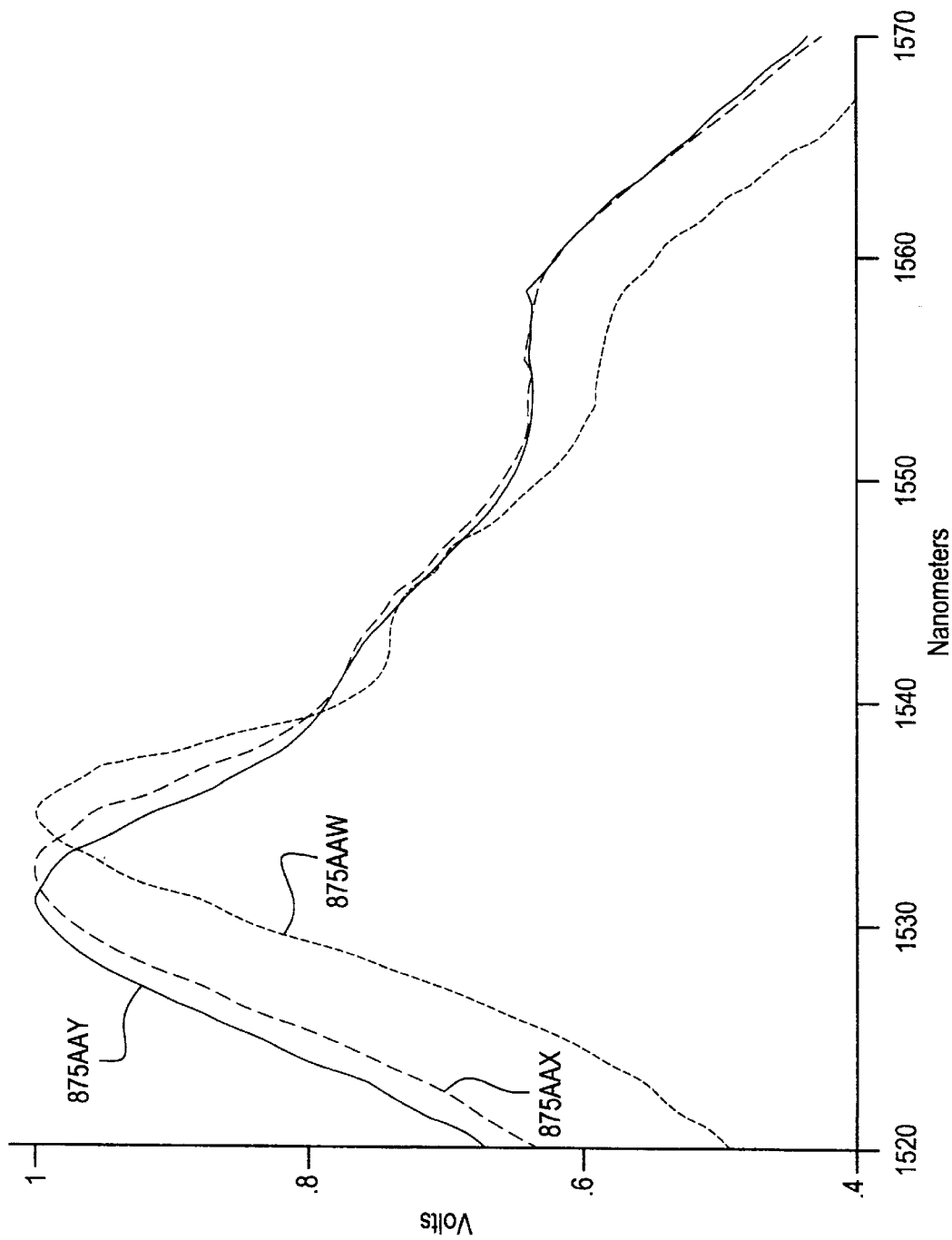
FIG. 1 is a graph showing the effect of the mole ratio of $Ta_2O_5/Li_2O$ on broadening of the erbium emission, as measured by fluorescence intensity against wavelength between 1520 nm and 1570 nm. Peak emissions were similar for each of the glasses, however, as the mole ratio of $Ta_2O_5/Li_2O$ increased from 0.5 to 1.0, shifting of the peak emission and broadening of the emissions band occurs.

One aspect of the present invention relates to glasses which include 4–70 wt. % $SiO_2$, 0.5–20 wt. % $Al_2O_3$, 0–20 wt. % $R_2O$, 0–30 wt. % R'O, 8–85 wt. % $Ta_2O_5$, 0–40 wt. % $Nb_2O_5$, and 0.01–1.0 wt. % $R''_2O_3$, where $R_2O+R'O$ is between about 2–35 wt. %, $Ta_2O_5+Nb_2O_5$ is between about 8–85 wt. %, R is selected from a group consisting of Li, Na, K, and combinations thereof, R' is selected from a group consisting of Ba, Sr, Ca, Mg, Zn, Pb, and combinations thereof, and R" is a rare earth element.

The glass of the present invention is highly desirable because it can be fabricated in air using standard melting techniques and batch reagents. In addition, the glass of the present is stable against devitrification, compatible with currently available silica cladding materials, and easily drawn into fibers. Moreover, the glass has a gain spectrum with excellent breadth and flatness characteristics which can be readily modified for specific optical amplifier applications.

The glass matrix of the present invention includes at least two distinct phase separated amorphous particles. As suggested by well-known phase equilibria data demonstrating gross immiscibility in the $SiO_2$—$Ta_2O_5$ system (Levin et al., *Phase Diagrams for Ceramists,* FIG. 4447 (1975), which is hereby incorporated by reference), as well as phase separation in $SiO_2$—$LiTaO_3$ glasses (Ito et al., "Transparency of $LiTaO_3$—$SiO_2$—$Al_2O_3$ Glass-Ceramics in Relation to their Microstructure," *J. Mat. Sci.,* 13:930–38 (1978), which is hereby incorporated by reference), the two amorphous phases in the glasses of the present invention are believed to be enriched in $SiO_2$ and $Ta_2O_5$, respectively. $Eu^{3+}$ phonon side band measurements and $Er^{3+}$ fluorescence indicate that the rare earth ions are incorporated into the $Ta_2O_5$ rich phase, resulting in broad emission at 1530 nm and minimal coupling to the silicate phonons.

The local bonding environments of rare earth elements in glasses determine the characteristics of their emission and absorption spectra. Several factors influence the width, shape, and absolute energy of emission and absorption bands, including the identity of the anion(s) and next-nearest-neighbor cations, the symmetry of any particular site, the total range of site compositions and symmetries throughout the bulk sample, and the extent to which emission at a particular wavelength is coupled to phonon modes within the sample.

The glasses of the present invention are characterized by improved dispersal of the rare earth elements throughout the tantalate/niobate phase of the glass. The rare earth elements include Y, La, Ce, Pr, Nd, Pm, Sm, Eu, Gd, Tb, Dy, Ho, Er, Tm, Yb, and Lu. While any rare earth element may be included in a glass, Er, Pr, and Nd are particularly desirable, because of the beneficial characteristics they impart to the resulting glasses. Of these rare earth elements, Er is especially preferred because of its emission near the 1550 nm band.

For optical amplifier applications, the region over which a convolution of the emission and absorption is the flattest is the optimal window through which to pass signals. Because both the position of the overall emission bands and the structure within the bands vary according to the content of the host glass, the window with optimal gain flatness also varies. Ideally, one would like to obtain the broadest emission possible in a single glass while maintaining gain flatness below acceptable levels. A flat emission spectrum is defined as one having less than 10% gain deviation over bands (or windows) up to about 32 nm wide. The glasses of the present invention achieve the desired gain flatness, while presenting significantly broader windows of the emission spectra.

Figure 2:
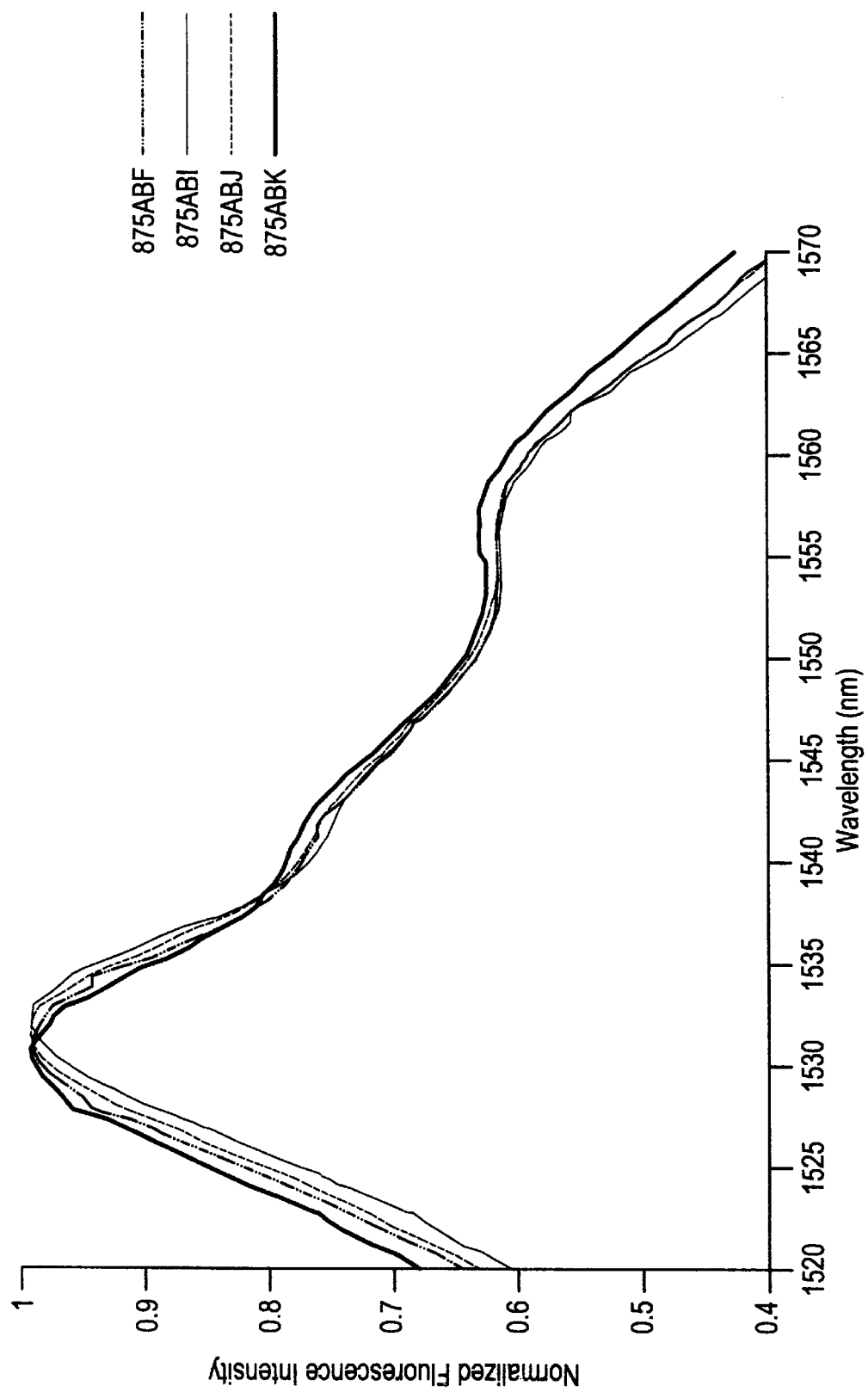
FIG. 2 is a graph showing the effect of the $Al_2O_3$ content on broadening of the erbium emissions, as measured by fluorescence intensity against wavelength. Peak emissions were similar for each of the glasses, however, as the content of $Al_2O_3$ increased from 0 mole % to 10 mole %, shifting of the peak emission and broadening of the emission band occurs.

It is possible to broaden peak emissions by adjusting the composition of the glass matrix in one of several ways. A first approach involves adjusting the mole ratio of $(Ta_2O_5+Nb_2O_5)/(R_2O+R'O)$, as shown in FIG. 1. Preferably, this ratio is between about 0.3 to 1.5, more preferably between about 0.6 to 1.2. A second approach involves increasing the alumina to silica mole ratio, as shown by FIG. 2.

Other modifications to the glass composition may also be made to improve fluorescence intensities and emission lifetimes, and also to modify liquification temperatures, viscosity curves, expansivity, and refractive index. The content of alkali and alkaline earth metals included in the glass may be adjusted to vary the refractive index and to increase or decrease thermal expansivity. Glasses containing optically active rare earth elements can be co-doped with non-active rare earth elements (for example, Er co-doped with La or Y) to increase emission lifetimes, or co-doped with optically active rare earth elements (such as Er co-doped with Yb) to improve pump power absorption. An example of co-doping with non-active rare earth elements is the introduction of 0.35 wt. % $La_2O_3$ or $Y_2O_3$.

The preferred glasses may also contain various other modifiers, each of which has a different effect on the properties of the resulting glass. For example, the glass matrix of the present invention may further include 0–5 mole % of other oxides, such as $Y_2O_3$, $La_2O_3$, CdO, $B_2O_3$, SnO, $ZrO_2$, $P_2O_5$, $Sb_2O_5$, $As_2O_5$, or $Bi_2O_3$. Several of the above-listed modifiers (e.g., $P_2O_5$, $Sb_2O_5$, $As_2O_5$) affect the properties of the silica phase, whereas others (e.g., $Y_2O_3$, $La_2O_3$, CdO, $B_2O_3$, SnO, $ZrO_2$, $Bi_2O_3$) affect the properties of the tantalate/niobate phase. Other oxides which may be added include ZnO and PbO. A limited amount of PbO is useful for increasing the dielectric constant of the resulting glass ceramic; however, the addition of too much PbO will contribute to development of haze.

The glasses of the present invention may further include 0–2.5 wt. % of one or more halides, such as F or Cl.

Also, $R_2O$ may be replaced on a molar basis by up to one-third $R'''_2O$, where $R'''$ is Rb or Cs.

In addition, $Al_2O_3$ may be replaced on a molar basis by up to one-third $Ga_2O_3$.

The glasses of the present invention are characterized by low-loss transmission as well as surprising gain characteristics at the optimum amplification window. The fiberized glasses display losses of less than 0.5 dB/m and gain curves exhibiting less than ten percent gain deviation over bands exceeding 32 nm. These properties of the glasses make them particularly useful for the fabrication of a variety of optical devices. Provided with a compatible covering or cladding, the glasses can be formed into fiber-optical amplifiers or lasers. Examples of methods for forming glass fiber preforms include: outside vapor deposition, vapor axial deposition, modified chemical vapor deposition, and plasma-enhanced chemical vapor deposition, all of which are well known in the art; sol-gel, as described in U.S. Pat. No. 5,123,940 to DiGiovanni et al., which is incorporated herein by reference; solution doping, as described in U.S. Pat. No. 4,923,279 to Ainslie et al., which is incorporated herein by reference; and the cullet-in-tube method, as described in U.S. Provisional Patent Application Ser. No. 60/050,469, which is hereby incorporated by reference. Once the preform is prepared, a fiber can be drawn by conventional techniques.

The glasses of the present invention can also be used alone in planar amplifier applications. Planar waveguides can be formed by modifying the above-described soot deposition techniques to include conventional lithographic techniques for the introduction of optical circuitry to the planar waveguide. Alternatively, planar waveguides may be prepared according to the method set forth in U.S. Pat. No. 5,125,946 to Bhagavatula, which is hereby incorporated by reference.

Glasses of the present invention may be fabricated using any conventional technique such as crucible melting, sol-gel, etc. Using a conventional crucible melting technique, the glasses are formed by providing a batch mixture, such as an admixture, that has a composition as set forth above. The batch materials are then treated under conditions effective to produce the glass matrix. The treatment generally comprises melting the batch materials at a temperature of from about 1550° C. to about 1650° C. for from about 4 to about 16 hours to produce a glass melt and cooling the glass melt to produce the glass matrix. Moreover, depending upon the desired use of the glass, the glass melt may be formed into a shaped article by forming procedures such as, for example, rolling, pressing, casting, or fiber drawing. Pressing and/or rolling is particularly desirable for glasses having a high tantalate content and low silica content. The resulting shaped article, which is preferably a patty, rod, sheet, or fiber, is cooled and then, optionally annealed. After annealing, the shaped article is allowed to cool to room temperature.

Variations of the above-described manufacturing process are possible without departing from the scope of the present invention. For example, because the glass manufacturing process is temperature-time dependent, it is possible to vary the dwell time of the glass forming and annealing steps depending upon the rate of heating.

The present invention further relates to a transparent glass ceramic matrix which contains pyrochlore, perovskite, or a combination thereof as its major crystal phase, and comprises 4–40 wt. % $SiO_2$, 1–15 wt. % $Al_2O_3$, 0–20 wt. % $K_2O$, 0–12 wt. % $Na_2O$, 0–5 wt. % $Li_2O$, 8–85 wt. % $Ta_2O_5$, and 0–45 wt. % $Nb_2O_5$, where $Ta_2O_5+Nb_2O_5$ is at least about 20 wt. % and $(K_2O+Li_2O+Na_2O)$ is between about 5–20 wt. %.

Doping the glass starting material with a rare earth metal is desirable for enhancing the emission and absorption spectra, as discussed above. Therefore, the glass ceramics of the present invention may further include an oxide of a rare earth element, such as Y, La, Ce, Pr, Nd, Pm, Sm, Eu, Gd, Tb, Dy, Ho, Er, Tm, Yb, or Lu. Preferably, the rare earth element is Er, Pr, Eu, or Dy. Even more preferably, the rare earth element is Er (e.g., $Er_2O_3$).

The glass ceramics of the present invention include those which contain oxides of potassium, lithium, tantalum, and niobium (KLTN); those which contain oxides of potassium, lithium, and tantalum (KLT); those which contain oxides of potassium, tantalum and niobium (KTN); and those which contain oxides of sodium, tantalum, and niobium (STN).

Therefore, KLTN glass ceramics of the present invention are characterized by a ratio of $(K^+/(K^++Li^+))$ which is about 0.7 to 1.0, more preferably, about 0.73 to 0.87. For KTN glass ceramics, the $(K^+/(K^++Li^+))$ ratio is 1.0. The higher potassium content is desirable because it has been shown to improve transparency of the resulting glass ceramic. Further, KLTN glass ceramics of the present invention are characterized by a ratio of ($Nb^{5+}/(Nb^{5+}+Ta^{5+})$) which is about 0.1 to 0.8, more preferably, about 0.2 to 0.5. Increasing the niobium content increases crystal stability at the expense of glass stability.

The STN glass ceramics may contain additional amounts of oxides of potassium or lithium. For example, upon addition of $Li_2O$ the ratio of ($Na^+/(Na^++Li^+)$ ) is preferably between about 0.7 to 1.0, more preferably about 0.85 to 0.95. Greater lithium content provides better glass stability at the expense of lower crystallinity in the glass ceramic. In addition, for the STN glass ceramics the ($Nb^{5+}/(Nb^{5+}+Ta^{5+})$) ratio is preferably between about 0 to 0.5, more preferably, about 0.2 to 0.3.

The starting glass material may contain additional modifiers, such as $As_2O_5$, $Sb_2O_3$, and F, in an amount of between about 0.1 to 1.0 wt. %. The $As_2O_5$ is particularly useful when the glass starting material contains niobates, because the $As_2O_5$ aids in maintaining Nb in its +5 oxidation state. Therefore, the KLTN, KTN, and STN glass ceramics of the present invention may also comprise between about 0.1 to 1.0 wt. % $As_2O_5$, preferably between 0.1 to 0.5 wt. % $As_2O_5$.

The glass ceramic of the present invention which contains a crystalline pyrochlore and/or perovskite structure as its major crystal phase is characterized by its transparency and ferro-electric properties. Although pyrochlore and perovskite are both cubic structures of similar composition (e.g., $KTaO_3$), the pyrochlore is believed to be metastable. It generally crystallizes initially from potassium rich glasses and transforms to perovskite on heat treatment (Nassau et al., "Quenched Metastable Glassy and Crystalline Phase In the System Lithium-Sodium-Potassium-Metatantalate," *J. Am. Ceramics Soc.* 62:74 (1979)). Perovskite precipitates directly from sodium rich glasses. The transparency of such glass ceramics is attributable to the crystal phase having an average crystal size of less than about 100 nm, more preferably, less than about 40 nm. Moreover, the glass ceramics containing perovskite as its major crystal phase are generally characterized by a high dielectric constant and low dielectric losses. The dielectric constant of these glass ceramics range from about 12 to 45 at about 20–24° C., 100 KHz. The dielectric loss factor for these glass ceramics is below about 0.01 and more preferably below about 0.05 at about 20–24° C., 100 KHz.

Another aspect of the present invention relates to a method of making the glass ceramics of the present invention. The manufacture of glass ceramics is founded upon the controlled crystallization of glass articles through heat treatment thereof. Thus, glass ceramics may be manufactured from the glasses of the present invention. This process is performed as generally set forth in U.S. Pat. No. 2,920,971 to Stookey, which is incorporated herein by reference.

Briefly, the process includes three fundamental steps. First, a glass batch is formed, typically from an admixture containing glass-forming components and crystal-forming components (e.g., nucleating agents), and possibly additional modifiers, which is heated to form a glass melt. Next, the glass melt is cooled to form a glass article. Finally, the glass article is exposed to defined heat-treatments such that relatively uniformly-sized, fine-grained crystals are homogeneously dispersed in a glassy matrix. In practice, the heat-treatments include a first heat treatment, at a temperature above the transformation range of the glass but below the softening point thereof, which causes development of nuclei therein. This is followed by a second heat treatment, at a temperature above the softening point of the glass, which promotes growth of the nucleated crystals.

According to one embodiment, a method is provided for preparing a transparent glass ceramic matrix which contains perovskite as its major crystal phase and comprises 4–40 wt. % $SiO_2$, 1–15 wt. % $Al_2O_3$, 0–20 wt. % $K_2O$, 0–12 wt. % $Na_2O$, 0–5 wt. % $Li_2O$, 8–85 wt. % $Ta_2O_5$, and 0–45 wt. % $Nb_2O_5$, wherein $Ta_2O_5+Nb_2O_5$ is at least about 20 wt. % and ($K_2O+Li_2O+Na_2O$) is between about 5–20 wt. %. The method comprises providing an admixture comprising glass forming components (e.g., $SiO_2$, $Al_2O_3$) and crystal forming components (e.g., $K_2O$, $Na_2O$, $Li_2O$, $Ta_2O_5$, $Nb_2O_5$), and treating the admixture under conditions effective to produce the transparent glass ceramic matrix with perovskite as its major crystal phase. The treatment applied to the admixture includes melting the admixture at a temperature of from about 1300° C. to about 1650° C. for from about 2 to about 16 hours to produce a glass melt, and then cooling the glass melt to produce a glass. Once the glass is obtained, it is heated to a temperature of from about 650° C. to about 800° C. for from about 0.5 to about 4 hours to produce nucleated crystals within the glass. The nucleated glass is then heated to a temperature of from about 750° C. to about 1000° C. for from about 0.5 to about 4 hours to cause development of the nucleated crystals, thereby forming the transparent glass ceramic.

Certain additions to the oxide formulations may be useful to enhance glass quality or increase crystallinity, such as $As_2O_5$, $Sb_2O_3$, $TiO_2$, ZnO, CdO, or F. Additions of up to about 5.0 wt. % $TiO_2$, CdO, or ZnO are desirable.

Depending upon the proposed end-use of the glass ceramic, it may be desirable to add to the batch admixture, prior to treatment, an oxide of a rare earth element such as Y, La, Ce, Pr, Nd, Pm, Sm, Eu, Gd, Tb, Dy, Ho, Er, Tm, Yb, or Lu.

Various modifications in the manufacturing process are possible without departing from the scope of the present invention. For example, when a glass melt is cooled below the transformation range and formed as a glass, the glass may be cooled to room temperature to permit visual inspection of its quality prior to commencing further treatment to cause nucleation and crystal development. Nevertheless, where speed in production and fuel economies are desired, the glass melt may merely be quenched to a glass shape at just below the transformation range with in situ crystallization then immediately initiated. Further, although a two-step heat treatment schedule is preferred, a satisfactory product is obtained when a single heat treatment is performed (e.g., heating to a temperature within the range from about 700° C. to about 1000° C., depending upon its content) for a sufficient duration to cause nucleation and subsequent crystal development. Finally, if the rate of heating is not too rapid and the final crystallization temperature is near the upper extreme of the heat treating range, then no dwell period at any one temperature will be necessary. However, since the growth of crystals is time and temperature dependent, the rate of heating the glass article above the transformation range must not be so rapid that the growth of sufficient crystals to support the article (and its intended use) cannot occur. Suitable heating rates will vary depending upon the composition of the glass, but typically such rates are less than 10° C. per minute, and more preferably less than 5° C. per minute.

The resulting glass ceramic thus formed is characterized by being free of voids and non-porous. Further, due to their crystalline nature, the chemical and physical properties of the glass ceramic will be more akin to those of the crystal phase (which makes up more than 50% by weight of the glass ceramic) than those of the original glass. In addition, the residual glass matrix will have a different composition than the glass article as a result of the precipitation of crystals.

The glass ceramics of the present invention which display ferro-electric properties are suitable for use in forming a ferro-electrical optical component of an electro-optical device, such as an electro-optical switch. The ferro-electric glass ceramics of the present invention are preferably the KTN, KTLN, and STN glass ceramics, as described above. The KTN, as perovskite glass ceramics, are preferred because of their complete solid solution and the ability to tailor the Curie temperature ($T_c$) from about 420° C. for $KNbO_3$ linearly to below 100° C. for $KTaO_3$. A similar effect is expected to occur between $NaTaO_3$ (with a $T_c$ of 480° C.) and $KTaO_3$, rendering this area similarly preferred. The addition of lithium (e.g., KLTN glass ceramics) is also desirable because it is believed to provide greater glass stabilization, and subsequent rapid formation of pyrochlore and/or perovskite crystals.

When used as electro-optical components in an electro-optical device, the transparent glass ceramic must exhibit ferro-electric hysteresis properties and have a high remnant polarization. Glass ceramics of the present invention which satisfy these criteria are suitable for use in an electro-optical switch of the type described in U.S. Pat. No. 3,639,771 to Borrelli et al., which is incorporated herein by reference.

In addition, the transparent glass ceramics of the present invention are useful as filtering cores of optical filter devices. One type of optical filtering device is disclosed in U.S. Pat. No. 5,067,789 to Hall et al., which is hereby incorporated by reference. Preferably the transparent glass ceramic used to form the filtering core is one which is doped with a rare earth element such as, for example, erbium.

EXAMPLES

The Examples set forth below are for illustrative purposes only and are not intended to limit, in any way, the scope of the present invention.

Example 1

Preparing KLT Glasses and Glass Ceramics

The various KLT glasses and glass ceramics were prepared by first mixing together the amounts of batch materials as shown in Table 1 below.

TABLE 1

| KLT Glass and Glass Ceramic Compositions | | | | |
| --- | --- | --- | --- | --- |
|  | 88BHH | 88BKG | 88BLG | 88BLH |
| $SiO_2$ | 15.0 | 10.5 | 14.7 | 14.5 |
| $Al_2O_3$ | 3.0 | 2.0 | 2.9 | 2.9 |
| $Ta_2O_5$ | 75.0 | 80.0 | 73.5 | 72.7 |
| $K_2O$ | 3.0 | 3.0 | 6.0 | 8.9 |
| $Li_2O$ | 4.0 | 4.5 | 2.9 | 1.9 |
|  | 88BND | 88LGZ | 88LIM | 88MGD |
| $SiO_2$ | 14.7 | 29.8 | 28.5 | 11.6 |
| $Al_2O_3$ | 2.4 | 4.8 | 4.6 | 1.8 |
| $Ta_2O_5$ | 72.7 | 57.6 | 55.1 | 68.0 |
| $K_2O$ | 7.3 | 5.8 | 9.8 | 7.3 |
| $Li_2O$ | 2.8 | 2.0 | 1.9 | 2.3 |

TABLE 1-continued

| KLT Glass and Glass Ceramic Compositions | | | | |
| --- | --- | --- | --- | --- |
| $TiO_2$ | — | — | — | 3.9 |
| CdO | — | — | — | 5.1 |

Subsequently, the batch materials were ball milled and charged into covered platinum crucibles. The crucibles were entered into an electrically heated furnace held at from about 1300° C. to about 1650° C. and melted for from about 2 to about 16 hours. Next, the melts were poured onto steel plates in order to form the melts into a patty. The melts then were cooled. Following cooling, the glass was examined and other physical properties of the glass measured. The results of the glass analysis are shown in Table 2 below.

TABLE 2

| KLT Glass Physical Properties | | | | |
| --- | --- | --- | --- | --- |
|  | 88BHH | 88BKG | 88BLG | 88BLH |
| Appearance | Clear | Clear w/ Slight Surface Devit. | Clear w/ Opal Areas | Clear w/ Some Opal |
|  | 88BND | 88LGZ | 88LIM | 88MGD |
| Appearance | Clear w/ Hazy Zones | Clear Yellow w/ Roller Opal Mark | Clear | Clear w/ Opalized Areas |

Following analysis of the KLT glasses, the glasses were cerammed by heating the glass patties in an electrically heated furnace, at from about 650° C. to about 775° C. for from about 0.5 to about 4 hours, to cause nucleation. After this first dwell time, the glass patties were heated at from about 750° C. to about 950° C. for from about 0.5 to about 4 hours to cause crystal growth. The resulting glass ceramics were then cooled. The specific ceram schedule followed for each sample is listed in Table 3 below. The appearance and crystal phases of each of the glass ceramics was examined as shown in Table 3. In addition, the dielectric constant, dielectric loss factor, and DC resistivity (measured in $Log_{10}$, as ohm-cm at 250° C.) are also shown in Table 3 for glass ceramics 88BHH and 88MGD. For glass ceramic 88BHH, the dielectric constant and dielectric loss factor were measured at 100 KHz, 21° C., and for glass ceramic 88MGD, they were measured at 100 KHz, 20° C.

TABLE 3

| KLT Glass Ceramic Physical Properties | | | | |
| --- | --- | --- | --- | --- |
|  | 88BHH | 88BKG | 88BLG | 88BLH |
| Ceram Schedule | 750° C. 2 h 850° C. 4 h | 750° C. 2 h 850° C. 4 h | 700° C. 2 h 775° C. 4 h | 700° C. 2 h 775° C. 4 h |
| Appearance | Clear w/ Haze | Clear w/ Haze | Clear w/ Opal Areas | Clear w/ Haze |
| Crystal Phases | Ilmenite |  | Perovskite, Ilmenite | Pyrochlore, Perovskite |
| Dielectric Constant | 25.15 | — | — | — |
| Loss Factor | 0.007 | — | — | — |
| $Log_{10}$ DC Resistivity | 7.97 | — | — | — |

TABLE 3-continued

KLT Glass Ceramic Physical Properties

|  | 88BND | 88LGZ | 88LIM | 88MGD |
|---|---|---|---|---|
| Ceram Schedule | 700° C. 2 h 800° C. 4 h | 750° C. 2 h 800° C. 4 h | 750° C. 2 h 900° C. 4 h | 700° C. 2 h 800° C. 4 h |
| Appearance | Clear w/ Some Opal | Clear Yellow-Gold | Hazy | Clear w/ Some Haze |
| Crystal Phases | Perovskite, Cristobalite | Pyrochlore, Perovskite | Pyrochlore, Perovskite | Pyrochlore |
| Dielectric Constant | — | — | — | 35.3 |
| Loss Factor | — | — | — | 0.004 |
| $Log_{10}$ DC Resistivity | — | — | — | 14.3 |

Example 2

Preparing KLTN Glasses and Glass Ceramics

The various KLTN glasses and glass ceramics were prepared by first mixing together the amounts of batch materials as shown in Table 4 below.

TABLE 4

KLTN Glass and Glass Ceramic Compositions

|  | 88LKZ | 88LLP |
|---|---|---|
| $SiO_2$ | 22.5 | 23.5 |
| $Al_2O_3$ | 4.1 | 4.3 |
| $Ta_2O_5$ | 56.0 | 45.1 |
| $Nb_2O_5$ | 5.9 | 14.1 |
| $Li_2O$ | 1.2 | 0.8 |
| $K_2O$ | 10.4 | 12.3 |

Subsequently, the batch materials were ball milled and charged into covered platinum crucibles. The crucibles were entered into an electrically heated furnace held at from about 1300° C. to about 1650° C. and melted for from about 2 to about 16 hours. Next, the melts were poured onto steel plates in order to form the melts into a patty. The melts then were cooled. Following cooling, the glass was examined and its physical properties were measured. The results of the glass analysis are shown in Table 5 below. Specifically, the dielectric constant (measured at 100 KHz, 24° C.), dielectric loss factor (measured at 100 KHz, 24° C.), and DC resistivity (measured in $Log_{10}$, as ohm-cm at 250° C.) of these glasses are shown.

TABLE 5

KLTN Class Physical Properties

|  | 88LKZ | 88LLP |
|---|---|---|
| Appearance | Clear Yellow | Clear Yellow |
| Dielectric Constant | 14.53 | 14.43 |
| Loss Factor | — | 0.007 |
| $Log_{10}$ DC Resistivity | 8.16 | 8.21 |

Following analysis of the KLTN glasses, the glasses were cerammed by heating the glass patties in an electrically heated furnace, at from about 650° C. to about 750° C. for from about 0.5 to about 4 hours, to cause nucleation. After this first dwell time, the glass patties were heated at from about 750° C. to about 900° C. for from about 0.5 to about 4 hours to cause crystal growth. The resulting glass ceramics were then cooled. The specific ceram schedule followed for each sample is listed in Table 6 below. Each of the glass ceramics was examined with respect to its appearance, crystal phase, dielectric constant (measured at 100 KHz, 22° C.), dielectric loss factor (measured at 100 KHz, 22° C.), and DC resistivity (measured in $Log_{10}$, as ohm-cm at 250° C.) The results of these analyses are also shown in Table 6.

TABLE 6

KLTN Glass Ceramic Physical Properties

|  | 88LKZ | 88LLP |
|---|---|---|
| Ceram Schedule | 700° 2 h 800° 4 h | 700° 2 h 800° 4 h |
| Appearance | Clear, Faint Haze | Clear, Faint Haze |
| Crystal Phases | Ilmenite | Perovskite |
| Dielectric Constant | 17.53 | 18.33 |
| Loss Factor | 0.026 | 0.014 |
| DC Resistivity | 7.53 | 6.45 |

Example 3

Preparing KTN Glasses and Glass Ceramics

The various KTN glasses and glass ceramics were prepared by first mixing together the amounts of batch materials as shown in Table 7 below.

TABLE 7

KTN Glass and Glass Ceramic Compositions

|  | 88LNA | 88LNB | 88LNE |
|---|---|---|---|
| $SiO_2$ | 25.3 | 27.0 | 32.0 |
| $Al_2O_3$ | 4.6 | 4.9 | 5.9 |
| $Ta_2O_5$ | 40.7 | 39.5 | 36.0 |
| $Nb_2O_5$ | 16.3 | 15.8 | 14.4 |
| $K_2O$ | 13.1 | 12.8 | 11.7 |
| $Er_2O_3$ | — | — | — |
| $As_2O_5$ | — | — | — |

|  | 88LNQ | 88LMX | 88LOI |
|---|---|---|---|
| $SiO_2$ | 26.9 | 23.2 | 26.9 |
| $Al_2O_3$ | 4.9 | 4.2 | 4.9 |
| $Ta_2O_5$ | 39.4 | 43.0 | 34.3 |
| $Nb_2O_5$ | 15.8 | 17.2 | 20.6 |
| $K_2O$ | 12.8 | 12.4 | 13.3 |
| $Er_2O_3$ | 0.3 | — | — |
| $As_2O_5$ | — | — | 0.5 |

|  | 88LOJ | 88LOK | 88LOL |
|---|---|---|---|
| $SiO_2$ | 27.7 | 28.9 | 31.1 |
| $Al_2O_3$ | 5.1 | 5.3 | 5.7 |
| $Ta_2O_5$ | 28.1 | 18.4 | — |
| $Nb_2O_5$ | 25.5 | 33.2 | 47.8 |
| $K_2O$ | 13.7 | 14.2 | 15.4 |
| $Er_2O_3$ | — | — | — |
| $As_2O_5$ | 0.5 | 0.5 | 0.5 |

Subsequently, the batch materials were ball milled and charged into covered platinum crucibles. The crucibles were entered into an electrically heated furnace held at from about 1300° C. to about 1650° C. and melted for from about 2 to about 16 hours. Next, the melts were poured onto steel plates in order to form the melts into a patty. The melts then were cooled. Following cooling, the glass was examined and other physical properties of the glass measured. The results of the glass analysis are shown in Table 8 below. Specifically, the dielectric constant (measured at 100 KHz, 24° C.), dielectric loss factor (measured at 100 KHz, 24° C.), and DC resistivity (measured in $Log_{10}$, as ohm-cm at 250° C.) of several glasses are shown.

TABLE 8

KTN Glass Physical Properties

|  | 88LNA | 88LNB | 88LNE |
|---|---|---|---|
| Appearance | Clear, Pale Amber | Clear, Amber | Clear, Pale Amber |
| Dielectric Constant | 14.02 | 12.99 | — |
| Loss Factor | 0.0132 | 0.008 | — |
| $Log_{10}$ DC Resistivity | 7.55 | 7.75 | — |

|  | 88LNQ | 88LMX | 88LOI |
|---|---|---|---|
| Appearance | Clear, Red-Amber | Clear | Clear, Pale Yellow-Pink |
| Dielectric Constant | — | — | — |
| Loss Factor | — | — | — |
| $Log_{10}$ DC Resistivity | — | — | — |

|  | 88LOJ | 88LOK | 88LOL |
|---|---|---|---|
| Appearance | Clear, Pale Yellow-Pink | Clear, Pale Yellow-Pink | Dense Opal |
| Dielectric Constant | — | — | — |
| Loss Factor | — | — | — |
| $Log_{10}$ DC Resistivity | — | — | — |

Following analysis of the KTN glasses, the glasses were cerammed by heating the glass patties in an electrically heated furnace, at from about 650° C. to about 750° C. for from about 0.5 to about 4 hours, to cause nucleation. After this first dwell time, the glass patties were heated at from about 750° C. to about 900° C. for from about 0.5 to about 4 hours to cause crystal growth. The resulting glass ceramics were then cooled. The specific ceram schedule followed for each sample is listed in Table 9 below. Each of the glass ceramics was examined with respect to its appearance and crystal phase. The dielectric constant, dielectric loss factor, and DC resistivity (measured in $Log_{10}$, as ohm-cm at 250° C.) for several of the glass ceramics were also measured. For glass ceramics 88LNA and 88LNB, the dielectric constant and dielectric loss factor were measured at 100 KHz, 21° C.; for glass ceramic 88LOK, the dielectric constant and dielectric loss factor were measured at 100 KHz, 22° C. The results of these analyses are also shown in Table 9.

TABLE 9

KTN Glass Ceramic Physical Properties

|  | 88LNA | 88LNB | 88LNE |
|---|---|---|---|
| Ceram Schedule | 700° C. 2 h 850° C. 4 h | 700° C. 2 h 850° C. 4 h | 700° C. 2 h 850° C. 4 h |
| Appearance | Clear, Slight Haze | Clear, Yellow | Clear, Amber, Slight Haze |
| Crystal Phase | Pyrochlore | Pyrochlore | Pyrochlore, Perovskite |
| Dielectric Constant | 21.96 | 21.34 | — |
| Loss Factor | 0.0246 | 0.036 | — |
| $Log_{10}$ DC Resistivity | 6.09 | 6.12 | — |

|  | 88LNQ | 88LMX | 88LOI |
|---|---|---|---|
| Ceram Schedule | 700° C. 2 h 800° C. 4 h | 750° C. 2 h 850° C. 4 h | 700° C. 2 h 850° C. 4 h |
| Appearance | Clear, Yellow w/ Green UV Fluorescence | Clear | Clear, Very Slight Haze |
| Crystal Phase | Pyrochlore | Pyrochlore, Perovskite | Pyrochlore |
| Dielectric Constant | — | — | — |
| Loss Factor | — | — | — |
| $Log_{10}$ DC Resistivity | — | — | — |

|  | 88LOJ | 88LOK | 88LOL |
|---|---|---|---|
| Ceram Schedule | 700° C. 2 h 850° C. 4 h | 750° C. 2 h 850° C. 4 h | — |
| Appearance | Clear, Very Slight Haze | Clear, Some Haze | — |
| Crystal Phase | Pyrochlore | Pyrochlore | — |
| Dielectric Constant | — | 21.21 | — |
| Loss Factor | — | 0.041 | — |
| $Log_{10}$ DC Resistivity | — | 6.13 | — |

Figure 7A:
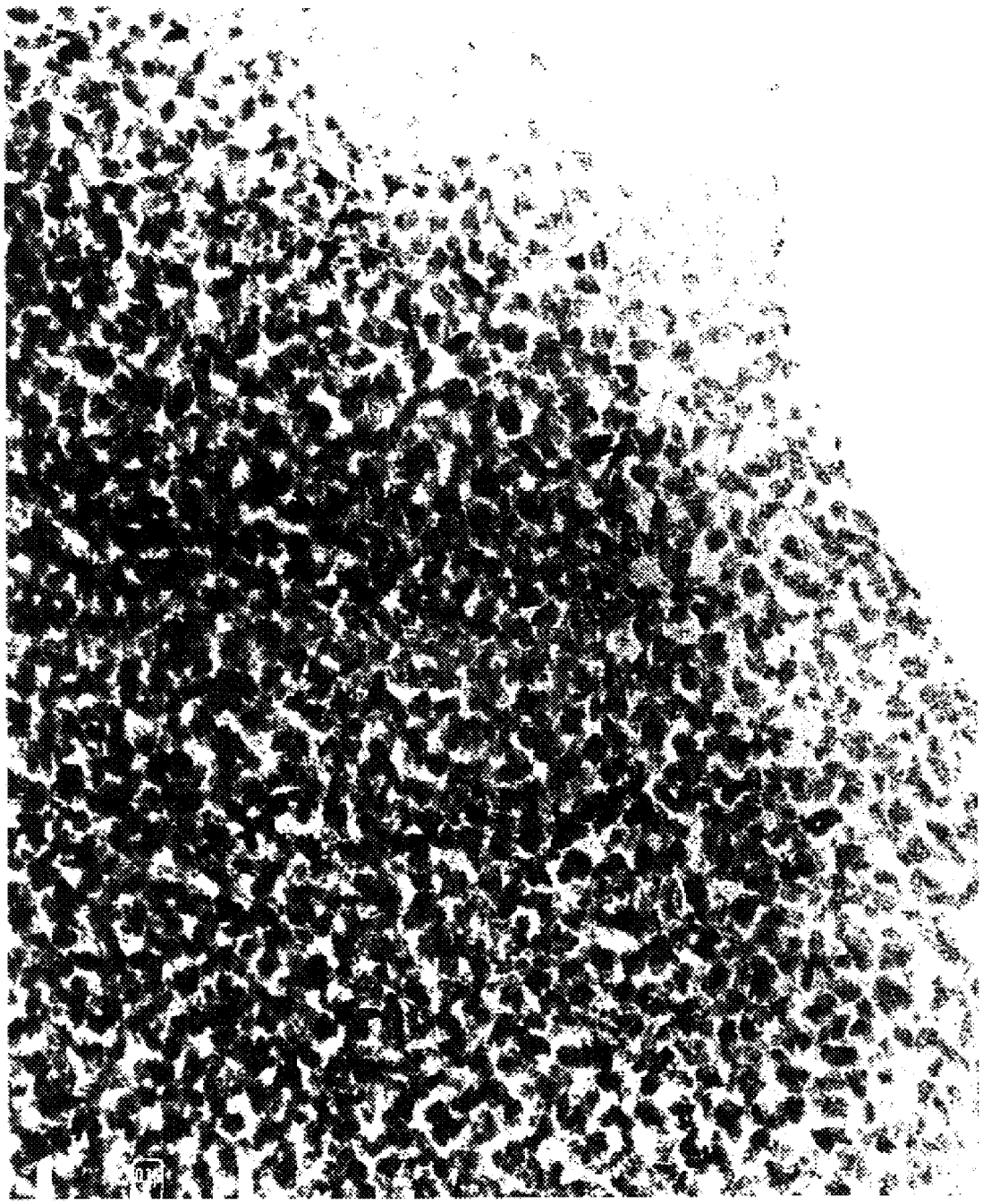
FIG. 7A is a photograph, prepared using transmission electron microscopy, of a glass ceramic having an $LiTaO_3$ ilmenite crystal phase. The glass ceramic was prepared following heat treatment of glass composition 88LUD.
Figure 7B:
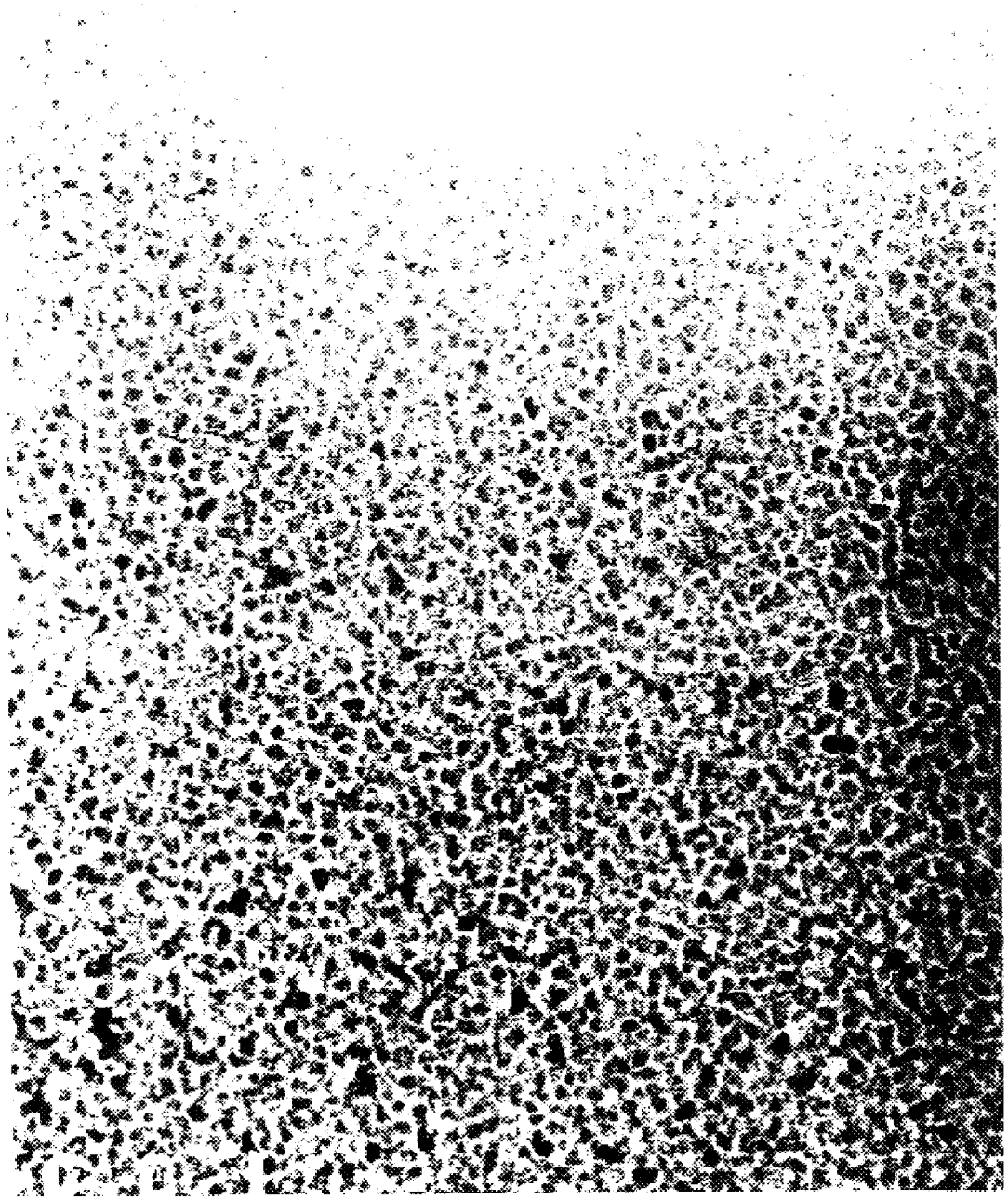
FIG. 7B is a photograph, prepared using transmission electron microscopy, of a glass ceramic having $K(Ta—Nb)O_3$ major pyrochlore and minor perovskite crystal phases. The glass ceramic was prepared following heat treatment of glass composition 88LMX. In each of FIGS. 7A and 7B, magnification is $4.0\times10^5$. A 0.1 μm scale is provided in the lower left corner of FIGS. 7A and 7B.

The glass ceramic of glass 88LMX was prepared as described in Table 9. The glass ceramic of glass 88LUD, described in Example 11, was prepared according to a ceram schedule of 700° C. for 2 hours to promote nucleation, followed by 800° C. for 4 hours to promote crystal growth (perovskite and pyrochlore). The glass ceramic of 88LUD was characterized by a hazy appearance with an $LiTaO_3$ ilmenite crystal structure. The difference in crystal structure is apparent upon examination of the photographs prepared by transmission electron microscopy, as shown in FIGS. 7A and 7B. The pyrochlore and perovskite crystals of the 88LMX glass ceramic are fine and very transparent. In contrast, the $LiTaO_3$ ilmenite crystals of 88LUD are coarser and hazier.

Example 4

Comparison of Emission Spectra of Glass 88LNQ and Glass Ceramic 88LNQ

Figure 5:
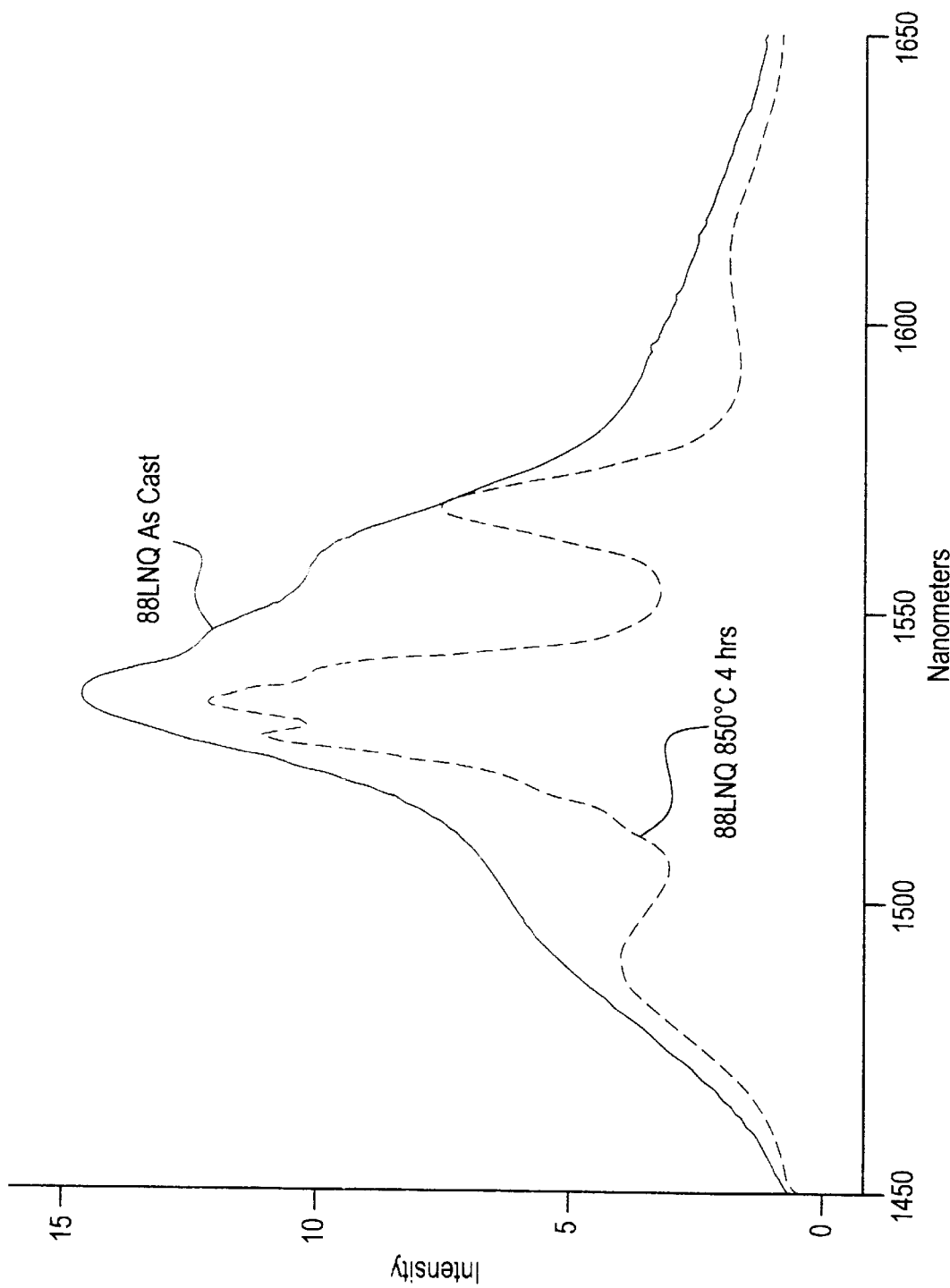
FIG. 5 is a graph which measures emission intensity versus wavelength for an erbium doped glass and the glass ceramic formed therefrom. The glass ceramic exhibited a significant decrease in the intensity of peak emission around 1530 nm as well as over the entire band of emissions between 1450 nm and 1650 nm. The glass ceramic also exhibited a slight narrowing of the width of emissions as compared to the precursor glass.

Both the 88LNQ glass and the 88LNQ glass ceramic, whose shared composition is shown in Table 7, exhibited emission spectra having peak emissions at or about 1530 nm, as shown in FIG. 5. The emission spectrum of the 88LNQ glass ceramic is significantly narrower across the band from 1450 nm to 1650 nm. This suggests that the $Er^{3+}$ ion may be selectively partitioned within the pyrochlore crystal phase, rather than in the glass phase. Without being bound to a particular theory, it is believed that the Er3+ site in the $KTaO_3$ crystal structure is better defined than the $Er^{3+}$ site in the glass, thereby providing the narrower emission spectrum.

Example 5

Preparing LTN Glasses and Glass Ceramics

The various LTN glasses and glass ceramics were prepared by first mixing together the amounts of batch materials as shown in Table 10 below.

TABLE 10

LTN Glass and Glass Ceramic Compositions

|  | 875VG | 875WH |
|---|---|---|
| $SiO_2$ | 15.2 | 14.8 |
| $Al_2O_3$ | 5.5 | 5.4 |
| $Ta_2O_5$ | 64.0 | 69.8 |
| $Nb_2O_5$ | 9.6 | 4.7 |
| $Li_2O$ | 5.4 | 5.3 |

Subsequently, the batch materials were ball milled and charged into covered platinum crucibles. The crucibles were entered into an electrically heated furnace held at from about 1300° C. to about 1650° C. and melted for from about 2 to about 16 hours. Next, the melts were poured onto steel plates in order to form the melts into a patty. The melts were then cooled and the glasses examined. Glass 875VG was clear, having an amber color with some opal. Glass 875WH was also clear, having an amber color.

Following analysis of the LTN glasses, the glasses were cerammed by heating the glass patties in an electrically heated furnace, at from about 650° C. to about 750° C. for from about 0.5 to about 4 hours, to cause nucleation. After this first dwell time, the glass patties were heated at from about 750° C. to about 900° C. for from about 0.5 to about 4 hours to cause crystal growth. The resulting glass ceramics were then cooled. The specific ceram schedule followed for each sample is listed in Table 11 below. The glass ceramics were examined with respect to its appearance and crystal phase, as shown in Table 11.

TABLE 11

Glass Ceramic Physical Properties

|  | 875VG | 875WH |
|---|---|---|
| Ceram Schedule | 725–50° 4 h<br>810° 1 h | 725–50° 4 h<br>810° 4 h |
| Appearance | Clear w/ Haze | Clear w/ Haze |
| Crystal Phases | $LiTaO_3$ w/β-spodumene | — |

Example 6

Preparing Other $R_2O$-Tantalum/Niobium Glasses and Glass Ceramics

The various $R_2O$-tantalum/niobium glasses and glass ceramics were prepared by first mixing together the amounts of batch materials as shown in Table 12 below.

TABLE 12

$R_2O$-Tantalum/Niobium Glass and Glass Ceramic Compositions

|  | 875AOB | 875AOC | 875AOF |
|---|---|---|---|
| $SiO_2$ | 16.7 | 16.7 | 18.0 |
| $Al_2O_3$ | 3.2 | 3.1 | 3.4 |
| $Ta_2O_5$ | 71.1 | 70.8 | 57.3 |
| $Nb_2O_5$ | — | — | 11.5 |
| $Li_2O$ | 0.4 | 0.4 | 0.4 |
| $Na_2O$ | 8.4 | 8.4 | 9.1 |
| $K_2O$ | — | — | — |
| F | — | 0.5 | 0.3 |
| $Er_2O_3$ | 0.1 | 0.1 | 0.1 |

|  | 875AOS | 88MJN |
|---|---|---|
| $SiO_2$ | 15.1 | 4.7 |
| $Al_2O_3$ | 2.9 | 12.1 |
| $Ta_2O_5$ | 71.6 | 48.5 |
| $Nb_2O_5$ | — | 19.4 |
| $Li_2O$ | 0.4 | — |
| $Na_2O$ | 6.7 | 3.8 |
| $K_2O$ | 2.8 | 11.5 |
| F | 0.4 | — |
| $Tm_2O_3$ | 0.1 | — |

Subsequently, the batch materials were ball milled and charged into covered platinum crucibles. The crucibles were entered into an electrically heated furnace held at from about 1300° C. to about 1650° C. and melted for from about 2 to about 16 hours. Next, the melts were poured onto steel plates in order to form the melts into a patty. The melts were then cooled and the glasses examined. Glasses 875AOB, 875AOC, 875AOF, and 875AOS were clear and glass 88MJN was clear with a slight pale yellow color.

Following analysis of the $R_2O$-Tantalum/Niobium glasses, the glasses were cerammed by heating the glass patties in an electrically heated furnace, at from about 700° C. to about 775° C. for from about 2.0 to about 4 hours, to cause nucleation. After this first dwell time, the glass patties were heated at from about 800° C. to about 925° C. for about 4 hours to cause crystal growth. The resulting glass ceramics were then cooled. The specific ceram schedule followed for each sample is listed in Table 13 below. The glass ceramics were examined with respect to its appearance, crystal phase, dielectric constant and dielectric loss factor (measured at 100 KHz, 20° C.), and $\log_{10}$ DC resistivity as shown in Table 13.

TABLE 13

$R_2O$-Tantalum/Niobium Class Ceramic Physical Properties

|  | 875AOB | 875AOC | 875AOF |
|---|---|---|---|
| Ceram Schedule | 775° 4 h<br>900° 4 h | 775° 4 h<br>900° 4 h | 775° 4 h<br>900° 4 h |
| Appearance | Clear w/ Faint Haze | Clear w/ Faint Haze | Clear w/ Faint Haze |
| Crystal Phase | Perovskite | Perovskite | Perovskite |
| Dielectric Constant | 34.31 | 33.23 | 42.94 |
| Loss Factor | 0.013 | 0.011 | 0.014 |
| $\log_{10}$ DC Resistivity | 10.1 | 10.98 | 10.76 |

|  | 875AOS | 88MJN |
|---|---|---|

TABLE 13-continued

R$_2$O-Tantalum/Niobium Class
Ceramic Physical Properties

| Ceram | 775° 4 h | 700° 2 h |
| --- | --- | --- |
| Schedule | 925° 4 h | 800° 4 h |
| Appearance | Clear w/ Faint Haze | Transparent w/ Some Haze |
| Crystal Phase | Perovskite | Pyrochlore |
| Dielectric Constant | 35.74 | — |
| Loss Factor | 0.04 | — |
| Log$_{10}$ DC Resistivity | 13.3 | — |

Example 7

Preparing Erbium-Doped R$_2$O-Tantalate-Halide Glasses

The various glasses were prepared by first mixing together the amounts of batch materials as shown in Table 14 below.

TABLE 14

Glass Compositions

| | 875ABB | 875ABC | 875AAW | 875AAX |
| --- | --- | --- | --- | --- |
| SiO$_2$ | 26.4 | 25.4 | 34.1 | 30.4 |
| Al$_2$O$_3$ | 4.36 | 4.22 | 5.66 | 5.1 |
| Ta$_2$O$_5$ | 60.0 | 57.8 | 51.7 | 57.6 |
| Li$_2$O | 0.45 | 0.43 | 6.99 | 5.46 |
| Na$_2$O | 7.48 | — | — | — |
| K$_2$O | — | 10.9 | — | — |
| F | — | — | — | — |
| Cl | 1.07 | 1.03 | 1.38 | 1.23 |
| Er$_2$O$_3$ | 0.14 | 0.14 | 0.186 | 0.16 |

| | 875AAY | 875ABI | 875ABJ | 875ABF |
| --- | --- | --- | --- | --- |
| SiO$_2$ | 27.5 | 20.1 | 20.5 | 21.0 |
| Al$_2$O$_3$ | 4.56 | — | 1.74 | 3.57 |
| Ta$_2$O$_5$ | 62.5 | 73.8 | 71.7 | 69.5 |
| Li$_2$O | 4.22 | 4.99 | 4.85 | 4.7 |
| Na$_2$O | — | — | — | — |
| K$_2$O | — | — | — | — |
| F | — | — | — | — |
| Cl | 1.11 | 0.945 | 0.97 | 0.99 |
| Er$_2$O$_3$ | 0.15 | 0.128 | 0.131 | 0.14 |

| | 875ABK | 875ACP |
| --- | --- | --- |
| SiO$_2$ | 22.0 | 28.9 |
| Al$_2$O$_3$ | 7.48 | 4.91 |
| Ta$_2$O$_5$ | 64.9 | 60.3 |
| Li$_2$O | 4.1 | 4.08 |
| Na$_2$O | — | — |
| K$_2$O | — | — |
| F | — | 0.31 |
| Cl | 1.04 | 1.13 |
| Er$_2$O$_3$ | 0.134 | 0.31 |

Subsequently, the batch materials were ball milled and charged into covered platinum crucibles. The crucibles were entered into an electrically heated furnace held at from about 1550° C. to 1650° C. for from about 4 to about 16 hours. Next, the melts were poured onto steel plates in order to form the melts into patties. The melts were then cooled. Following cooling, the physical properties of each glass were measured with respect to color, clarity or quality, and visible luminescence as set forth in Table 15 below.

TABLE 15

Glass Physical Properties

| | 875ABB | 875ABC | 875AAW | 875AAX |
| --- | --- | --- | --- | --- |
| Color Quality | Pink Clear, Some Opal | Pink Clear | Pink Clear | Pink Clear |
| Visible Luminescence | Green | Green | Green | Green |

| | 875AAY | 875ABI | 875ABJ | 875ABF |
| --- | --- | --- | --- | --- |
| Color Quality | Pink Mostly Clear, Some Opal | Pink Clear | Pink Clear | Pink Clear |
| Visible Luminescence | Green | Green | Green | Green |

| | 875ABK | 875ACP |
| --- | --- | --- |
| Color Quality | Pink Opal | Pink Opal |
| Visible Luminescence | Green | Green |

The emission spectra of glasses 875AAY and 875AAW were compared as indicators of the effect of changes to the R$_2$O/Ta$_2$O$_5$ molar ratio on emissions. Glass 875AAY has a Li$_2$O/Ta$_2$O$_5$ molar ratio of approximately 1.0, glass 875AAX has a Li$_2$O/Ta$_2$O$_5$ molar ratio of approximately 1.4, and glass 875AAW has a Li$_2$O/Ta$_2$O$_5$ molar ratio of approximately 2.0. Referring to FIG. 1, the emission spectra of glasses 875AAY, 875AAX, and 875AAW between 1520 nm and 1570 nm is shown. Glass 875AAW has a peak near 1535 nm. As the Li$_2$O/Ta$_2$O$_5$ molar ratio increases, peak emissions shift nearer to 1530 nm and a significant broadening of the emission lineshape occurs.

The emission spectra of glasses 875ABI, 875ABJ, 875ABF, and 875ABK were compared as indicators of the effect of changing the Al$_2$O$_3$ content on emissions. These glasses had the following approximate Al$_2$O$_3$ content, by mole percent:

| 875ABI | 0 |
| --- | --- |
| 875ABJ | 2.5 |
| 875ABF | 5 |
| 875ABK | 10 |

Referring to FIG. 2, the emission spectra of the above glasses suggests that an increase in the Al$_2$O$_3$ content has the effect of broadening the emissions, as well as contributing to a slight downward shift in peak emissions closer to 1530 nm.

Example 8

Preparing Erbium-Doped R'O-Tantalate-Halide Glasses

The various glasses were prepared by first mixing together the amounts of batch materials as shown in Table 16 below.

TABLE 16

| Glass Compositions | | | | |
|---|---|---|---|---|
| | 875AGT | 875AGZ | 875AHW | 875AJY |
| $SiO_2$ | 20.2 | 35.9 | 27.4 | 44.7 |
| $Al_2O_3$ | 15.7 | 7.47 | 10.3 | 10.8 |
| $Ta_2O_5$ | 46.3 | 40.5 | 44.8 | 35.2 |
| BaO | 16.1 | 14.0 | 15.5 | — |
| CaO | — | — | — | 6.7 |
| F | 0.54 | 0.66 | 0.58 | 0.81 |
| Dl | 0.995 | 1.21 | 1.08 | 1.51 |
| $Er_2O_3$ | 0.134 | 0.163 | 0.15 | 0.2 |

Subsequently, the batch materials were ball milled and charged into covered silica crucibles. The crucibles were entered into an electrically heated furnace held at from about 1550° C. to about 1650° C. for from about 4 to about 16 hours. Next, the melts were poured onto steel plates in order to form the melts into patties. The melts were then cooled. Following cooling, the physical properties of each glass were measured with respect to color, clarity or quality, visible luminescence, refractive index, CTE, and its gain ripple, as set forth in Table 17 below.

TABLE 17

| Glass Physical Properties | | | | |
|---|---|---|---|---|
| | 875AGT | 875AGZ | 875AHW | 875AJY |
| Color | Pink | Pink | Pink | Pink |
| Quality | Clear | Clear, Slight Opal | Clear | Clear |
| Visible Luminescence | Green | Green | Green | Green |
| Refractive Index | 1.71 | 1.65 | 1.65 | 1.59 |
| CTE | 39.8 | 35.2 | 38.3 | 34.9 |
| Gain Ripple 32 nm | — | 11.5% | 8.5% | 7.5% |

Example 9

Erbium-Doped ($R_2O+R'O$)-Tantalate Glasses

The various glasses were prepared by first mixing together the amounts of batch materials as set forth in Table 18 below.

TABLE 18

| Glass Compositions | | | | |
|---|---|---|---|---|
| | 88LYA | 88LYF | 88LYI | 88LYS |
| $SiO_2$ | 18.5 | 23.7 | 18.4 | 17.8 |
| $Al_2O_3$ | 4.8 | 4.3 | 4.8 | 4.7 |
| $Ta_2O_5$ | 68.7 | 56.8 | 69.5 | 57.0 |
| $Li_2O$ | 3.8 | — | 4.1 | 4.0 |
| $Na_2O$ | — | — | — | — |
| $K_2O$ | — | 8.8 | — | — |
| MgO | 4.2 | — | 3.2 | — |
| BaO | — | 4.6 | — | — |
| ZnO | — | — | — | 6.1 |
| $Er_2O_3$ | 0.16 | 0.16 | 0.16 | 0.16 |

Subsequently, the batch materials were ball milled and charged into covered platinum crucibles. The crucibles were entered into an electrically heated furnace held at from about 1550° C. to about 1650° C. for from about 4 to about 16 hours. Next, the melts were poured onto steel plates in order to form the melts into patties. The melts were then cooled. Following cooling, the physical properties of each glass were measured with respect to color, clarity or quality, and visible luminescence, as set forth in Table 19 below.

TABLE 19

| Glass Physical Properties | | | | |
|---|---|---|---|---|
| | 88LYA | 88LYF | 88LYI | 88LYS |
| Color | Grey | Salmon | Salmon | Pink |
| Quality | Clear | Clear | Clear | Some Haze and Devit. |
| Visible Luminescence | Green | Green | Bright Green | Green |

Example 10

Loss Characteristics of Erbium-Doped $R_2O$-Tantalate-Halide Glass

Glass 875ACP was prepared as described in Example 6 and subsequently drawn into a fiber. The fiber was then tested for its loss characteristic, measured in dB/m. This was performed by measuring loss over a fiber length of 10 meters, then cutting the fiber to a length of 2 meters and again measuring loss. The differential loss, therefore, is over a length of 8 meters.

Figure 4:
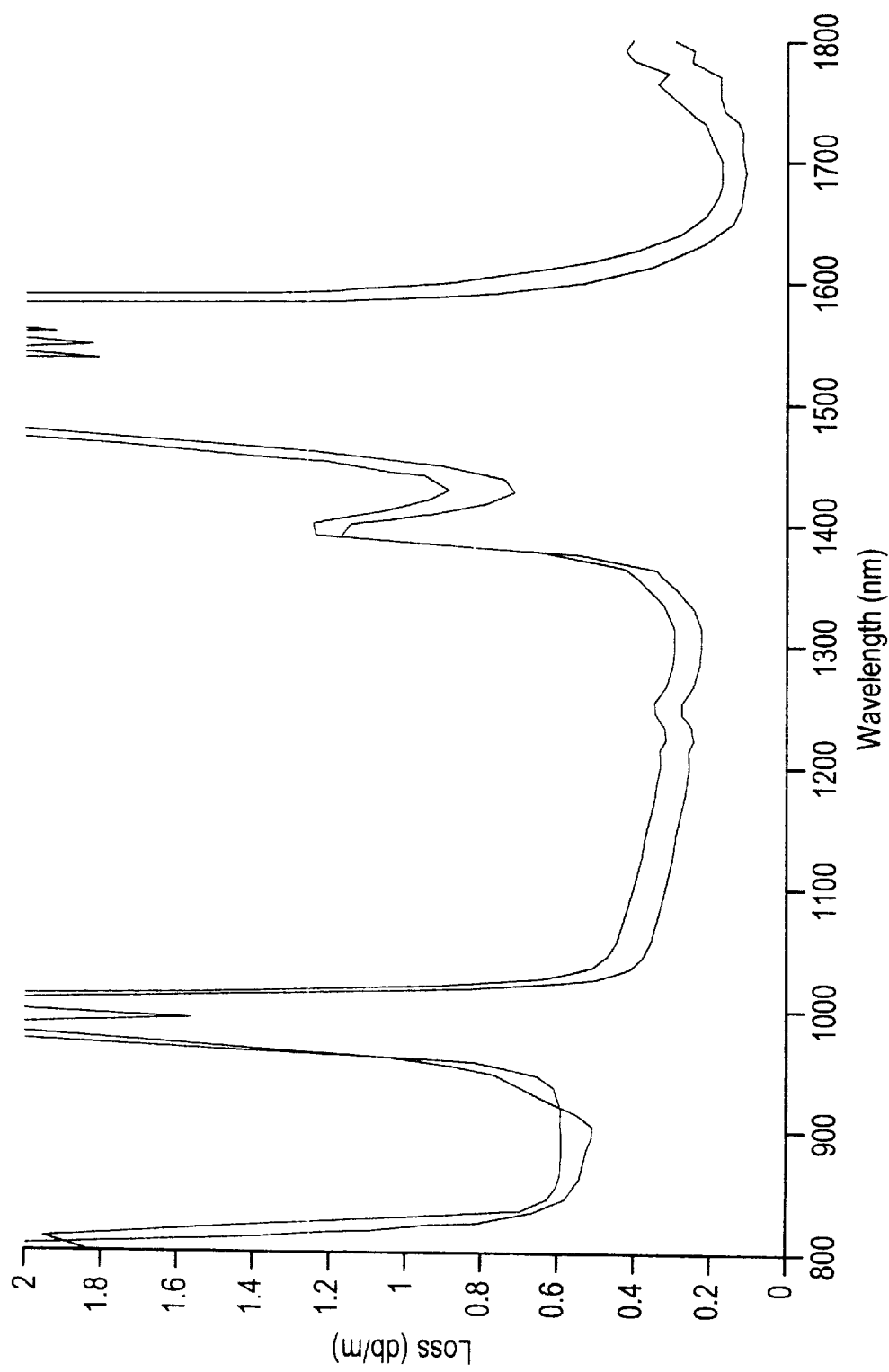
FIG. 4 is a graph which shows the fiber losses (dB/m) across the spectrum from 800 nm to 1800 nm. Losses of less than 0.5 dB/m are reached at between about 1050 nm and about 1370 nm, as well as above about 1600 nm. Absorption bands at 980 nm and 1530 nm are caused by erbium.

As shown in FIG. 4, the glass 875ACP fiber displayed losses of less than 0.5 dB/m between about 1050 nm and about 1370 nm, as well as above about 1600 nm. This, taken with excellent broadband absorption and emission near 1500 nm, suggests that the 875ACP glass is suitable for use as a fiber amplifier.

Example 11

Erbium-Doped R'O-Tantalate Glasses

The various glasses were prepared by first mixing together the amounts of batch materials as shown in Table 20 below.

TABLE 20

| Glass Compositions | | | | |
|---|---|---|---|---|
| | 129MXK | 88LSG | 169HVY | 159RD |
| $SiO_2$ | 27.1 | 21.5 | 23.0 | 23.7 |
| $Al_2O_3$ | 4.9 | 3.5 | 6.7 | 6.9 |
| $Ta_2O_5$ | 52.7 | 48.0 | 57.0 | 58.9 |
| MgO | — | — | — | — |
| CaO | 15.3 | — | — | 3.7 |
| SrO | — | — | 13.3 | 6.9 |
| BaO | — | — | — | — |
| ZnO | — | — | — | — |
| PbO | — | 27.0 | — | — |
| $Er_2O_3$ | 0.3 | 0.1 | 0.16 | 0.16 |
| | 159RG | 88LZP | 88LZQ | |
| $SiO_2$ | 21.6 | 19.5 | 17.5 | |
| $Al_2O_3$ | 6.3 | 10.8 | 12.8 | |
| $Ta_2O_5$ | 53.6 | 56.5 | 56.5 | |
| MgO | — | — | — | |
| CaO | — | — | — | |
| SrO | — | 13.2 | 13.2 | |
| BaO | 18.5 | — | — | |

TABLE 20-continued

Glass Compositions

| | | | |
|---|---|---|---|
| ZnO | — | — | — |
| PbO | — | — | — |
| $Er_2O_3$ | 0.16 | 0.16 | 0.16 |

Subsequently, the batch materials were ball milled and charged into covered platinum crucibles. The crucibles were entered into an electrically heated furnace held at from about 1550° C. to about 1650° C. for from about 4 to about 16 hours. Next, the melts were poured onto steel plates in order to form the melts into patties. The melts were then cooled. Following cooling, the physical properties of each glass were measured with respect to color, clarity or quality, and visible luminescence, as set forth in Table 21 below.

TABLE 21

Glass Physical Properties

| | 129MXK | 88LSG | 169HVY | 159RD |
|---|---|---|---|---|
| Color | Pink | White | Pink | Pink |
| Quality | Clear | Opal | Clear | Clear |
| Visible Luminescence | Green | Pale | Green | Green |

| | 159RG | 88LZP | 88LZQ |
|---|---|---|---|
| Color | Pink | Salmon | Salmon |
| Quality | Clear | Clear w/ Slight Devit. | Clear |
| Visible Luminescence | Green | Green | Green |

Example 12

Erbium-Doped $R_2O$-Tantalate Glasses

The various glasses were prepared by first mixing together the amounts of batch materials as shown in Table 22 below.

TABLE 22

Glass Compositions

| | 88LOZ | 88LPA | 88LPN | 88LRM | 88LSH |
|---|---|---|---|---|---|
| $SiO_2$ | 28.2 | 28.2 | 28.2 | 20.0 | 23.7 |
| $Al_2O_3$ | 4.6 | 4.6 | 4.6 | 3.2 | 4.3 |
| $Ta_2O_5$ | 63.0 | 63.0 | 63.0 | 72.0 | 60.3 |
| $Li_2O$ | 4.2 | 4.2 | 4.2 | 4.8 | — |
| $Na_2O$ | — | — | — | — | — |
| $K_2O$ | — | — | — | — | 11.7 |
| $Er_2O_3$ | 0.26 | 0.26 | 0.1 | 0.1 | 0.1 |
| $As_2O_5$ | — | 0.7 | — | — | 0.5 |

| | 88LUD | 88LVG | 88LVM | 88LVW | 88LWB |
|---|---|---|---|---|---|
| $SiO_2$ | 28.2 | 14.8 | 18.7 | 14.6 | 9.9 |
| $Al_2O_3$ | 4.6 | 9.0 | 3.8 | 2.2 | 6.7 |
| $Ta_2O_5$ | 63.0 | 71.4 | 72.6 | 78.0 | 78.0 |
| $Li_2O$ | 4.2 | 4.8 | 4.9 | 5.2 | 5.4 |
| $Na_2O$ | — | — | — | — | — |
| $K_2O$ | — | — | — | — | — |
| $Er_2O_3$ | 0.1 | 0.1 | 0.1 | 0.1 | 0.1 |
| $As_2O_5$ | — | — | — | — | — |

| | 88LZO | 88MAO | 88MAU |
|---|---|---|---|
| $SiO_2$ | 46.4 | 59.4 | 53.2 |

TABLE 22-continued

Glass Compositions

| | | | |
|---|---|---|---|
| $Al_2O_3$ | 10.5 | 9.2 | 16.3 |
| $Ta_2O_5$ | 40.4 | 29.4 | 28.5 |
| $Li_2O$ | 2.7 | 2.0 | 2.0 |
| $Na_2O$ | — | — | — |
| $K_2O$ | — | — | — |
| $Er_2O_3$ | 0.16 | 0.16 | 0.16 |
| $As_2O_5$ | — | — | — |

Subsequently, the batch materials were ball milled and charged into covered platinum crucibles. The crucibles were entered into an electrically heated furnace held at from about 1550° C. to about 1650° C. for from about 4 to about 16 hours. Next, the melts were poured onto steel plates in order to form the melts into patties. The melts were then cooled. Following cooling, the physical properties of each glass were measured with respect to color, clarity or quality, and visible luminescence, as set forth in Table 23 below.

TABLE 23

Glass Physical Characteristics

| | 88LOZ | 88LPA | 88LPN | 88LRM | 88LSH |
|---|---|---|---|---|---|
| Color | Pale Salmon | Pale Salmon | Pale Amber | Salmon | Pale Yellow |
| Quality | Clear | Clear | Clear | Clear | Clear |
| Visible Luminescence | Green | Green | Green | Green | Green |

| | 88LDD | 88LVG | 88LVM | 88LVW | 88LWB |
|---|---|---|---|---|---|
| Color | — | Salmon | Salmon | Salmon | Pink |
| Quality | — | Clear, w/ Some Opal Areas | Clear | Clear | Clear |
| Visible Luminescence | — | Yellow-Green | Yellow-Green | Yellow-Green | Green |

| | 88LZO | 88MAO | 88MAU |
|---|---|---|---|
| Color | Salmon | Salmon | Salmon |
| Quality | Hazy | Viscous, Seedy | Clear |
| Visible Luminescence | Green | Green | Green |

Example 13

Comparison of Phase-Separated Glass and Glass Ceramic, Using Glass 88LOZ

Figure 6A:
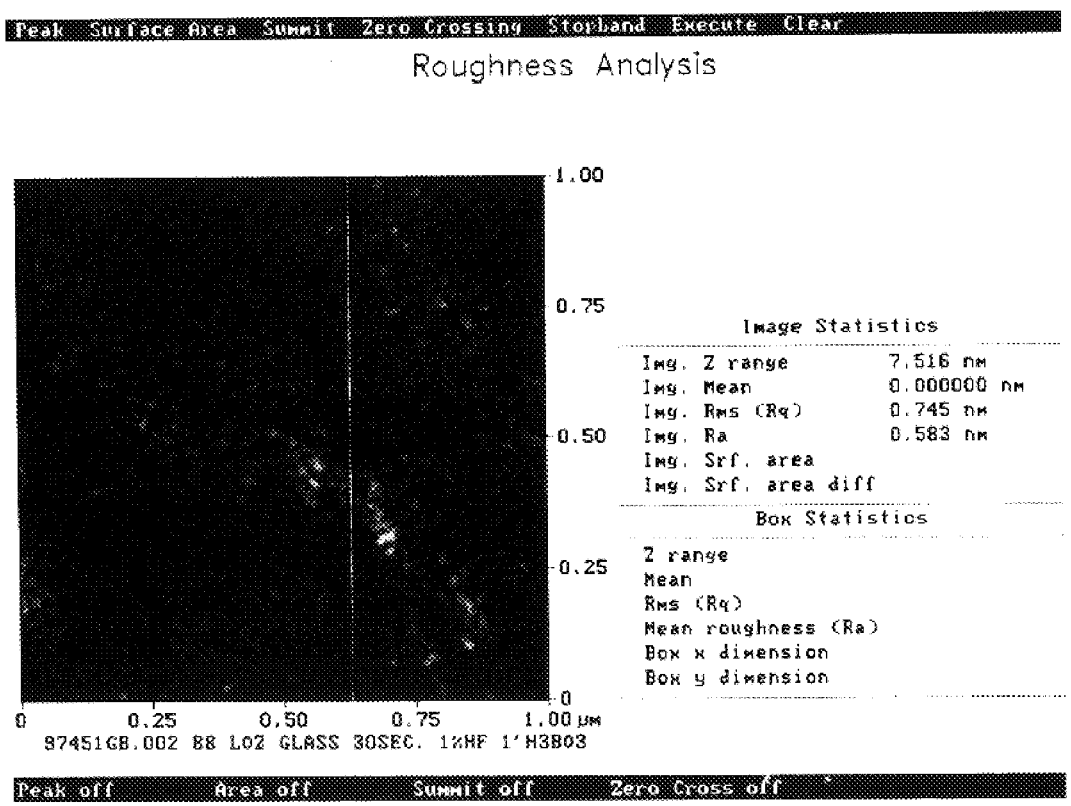
FIG. 6A is a photograph, prepared using atomic force microscopy, of the phase-separated glass composition 88LOZ.
Figure 6B:
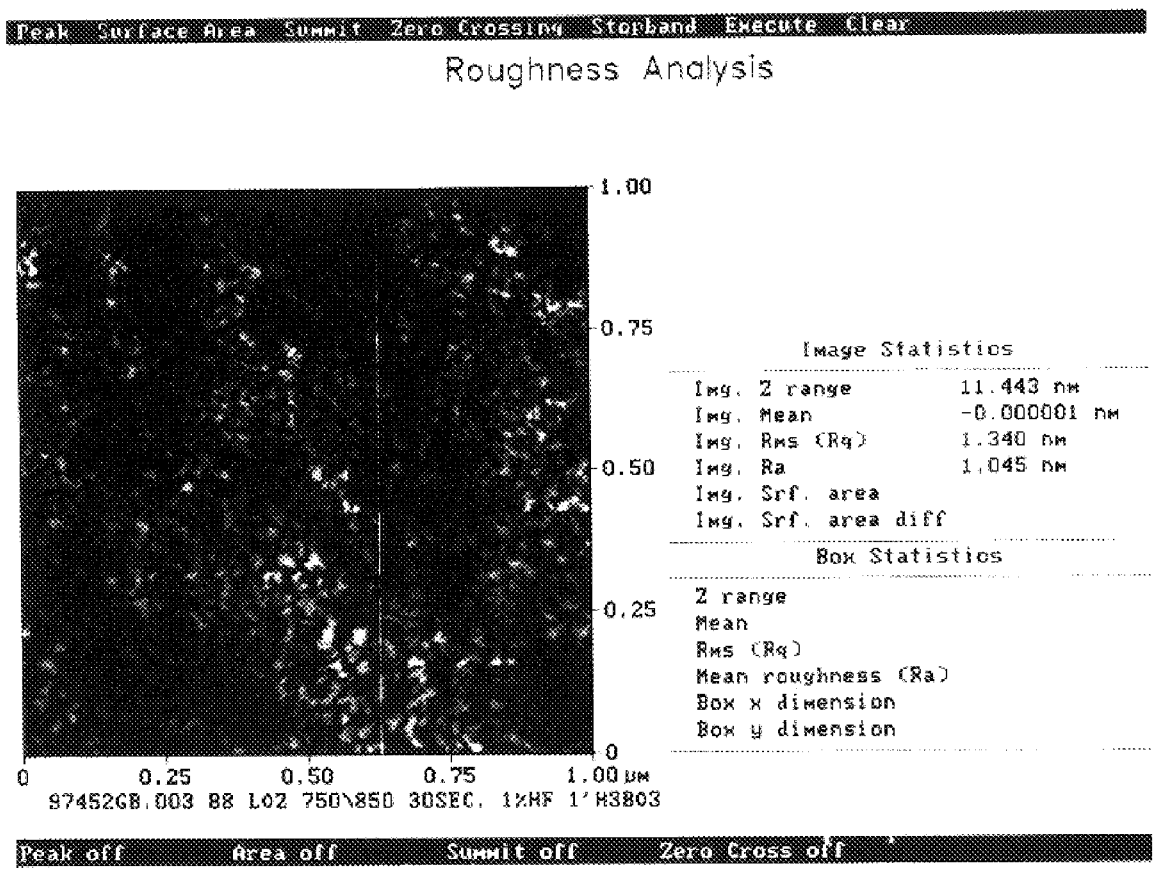
FIG. 6B is a photograph, prepared using atomic force microscopy, with the glass ceramic obtained following heat treatment of the glass composition 88LOZ. In each of FIGS. 6A and 6B, the field shown is 1.0 μm×1.0 μm.

Atomic force microscopy was used to prepare photographs, shown in FIGS. 6A and 6B, respectively, of the glass composition 88LOZ and its resulting glass ceramic. The glass ceramic was heat treated according to a ceram schedule of 750° C. for 2 hours to promote nucleation, followed by 850° C. for 4 hours to promote crystal growth. As compared to the amorphous glass in FIG. 6A, the glass ceramic of FIG. 6B exhibited significant crystal growth.

Example 14

Figure 3:
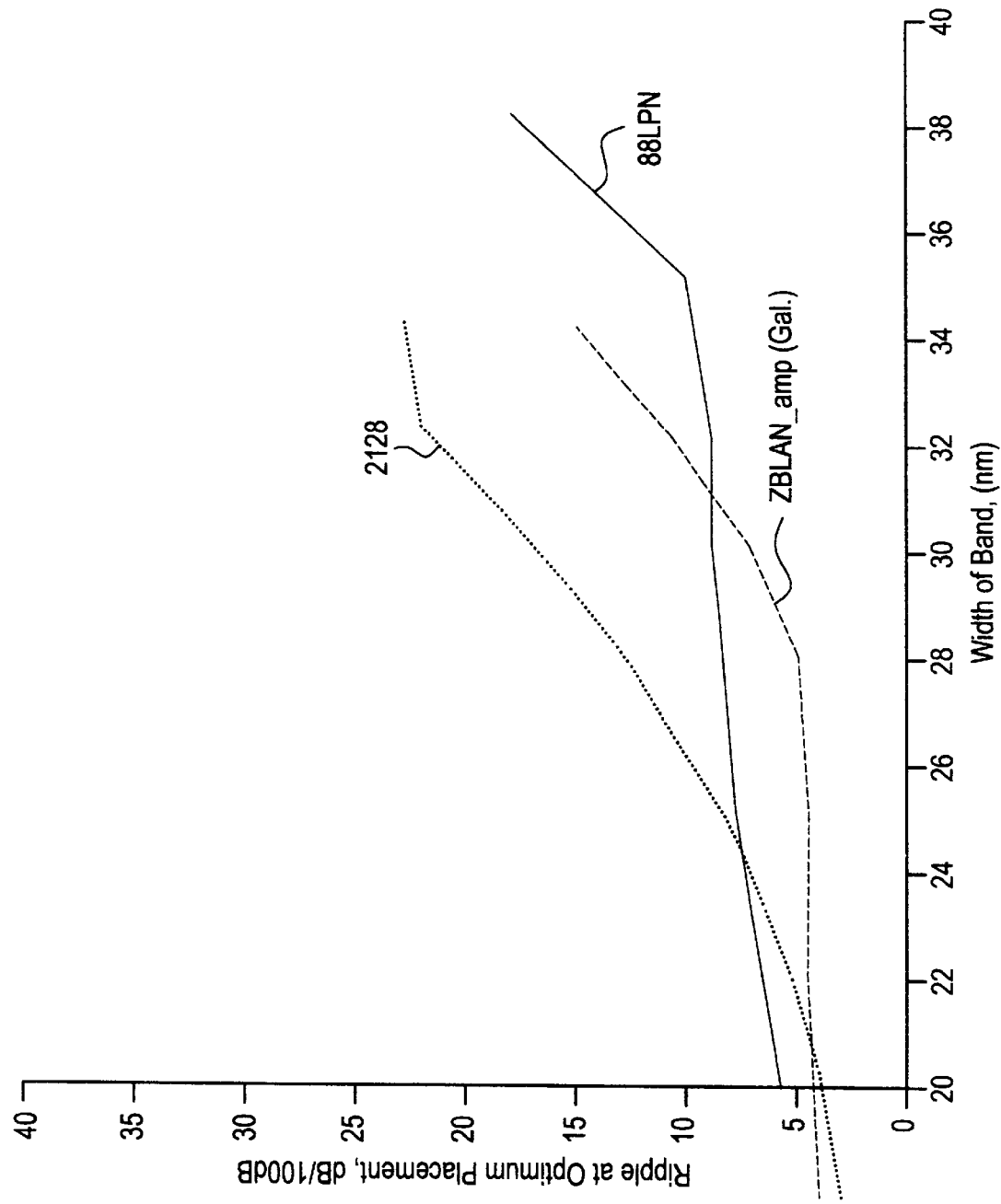
FIG. 3 is a graph which measures the gain ripple at optimum placement (dB/100 dB) versus the width of the emission band (nm). Data from a glass fiber amplifier of the present invention (88LPN) is compared to fiber amplifiers from two competitive glasses-i.e. a ZBLAN (Zr—Ba—La—Al—Na—fluoride) glass fiber amplifier available from Galileo (Sturbridge, Mass.), and 2128, an oxide glass fiber amplifier available from Corning, Inc (Corning, N.Y.). The glass of the present invention shows broader and flatter gain curves than the glasses utilized in either of the other amplifiers.

Gain Ripple vs. Bandwidth of Glass 88LPN Fiber as Compared to ZBLAN Fiber Amplifier and Corning 2128 Fiber Amplifier Using measured absorption and fluorescence data of fibers drawn from 88LPN (a glass of the present invention whose composition is set forth in Table 22 above), ZBLAN, and 2128 glasses, the gain as a function of wavelength was determined. The gain ripple was plotted against the width of the amplification band, producing a gain curve for each of the fibers as shown in FIG. 3. Ideal gain ripple is less than 10% (10 dB/100 dB) over a band of at least 32 nm.

It is preferable for a glass to possess a gain curve which remains below 10% gain ripple over a broader band. Corning's 2128 glass fiber displayed a gain deviation of about 10% at 26 nm and the ZBLAN glass fiber displayed a gain deviation of about 10% at 32 nm. In contrast, the 88LPN glass fiber displayed a gain deviation of less than 10% at 35 nm.

Example 15

Erbium-Doped $R_2O$ Tantalate-Niobate Glasses

The various glasses were prepared by mixing together the amounts of batch materials as shown in Table 24 below.

TABLE 24

Glass Compositions

| | 88LNQ | 88LPR | 88LPH | 88LWK |
|---|---|---|---|---|
| $SiO_2$ | 27.0 | 27.0 | 27.0 | 18.9 |
| $Al_2O_3$ | 4.9 | 4.9 | 4.9 | 3.6 |
| $Ta_2O_5$ | 39.5 | 39.5 | 39.5 | 31.3 |
| $Nb_2O_5$ | 15.8 | 15.8 | 15.8 | 35.8 |
| $Li_2O$ | — | — | — | 2.1 |
| $Na_2O$ | — | — | — | 8.3 |
| $K_2O$ | 12.8 | 12.8 | 12.8 | — |
| $Sb_2O_3$ | — | — | 1.0 | — |
| $Er_2O_3$ | 0.3* | 3.0* | 0.26* | 0.1 |
| $As_2O_5$ | — | — | — | 0.5 |

For each of glasses 88LNQ, 88LPR, and 88LPH, the erbium content was added in excess of 100% wt. %. Subsequent to supplying batch materials, the batch materials were ball milled and charged into covered platinum crucibles. The crucibles were entered into an electrically heated furnace held at from about 1550° C. to about 1650° C. for from about 4 to about 16 hours. Next, the melts were poured onto steel plates in order to form the melts into patties. The melts were then cooled. Following cooling, the physical properties of each glass were measured with respect to color, clarity or quality, and visible luminescence, as set forth in Table 25 below.

TABLE 25

Glass Physical Properties

| | 88LNQ | 88LPR | 88LPH | 88LWK |
|---|---|---|---|---|
| Color | Amber | Pink | Gold | Amber |
| Quality | Clear | Clear | Clear | Clear |
| Visible Luminescence | Green | Green | Pale | Pale Green |

What is claimed:

1. A transparent glass material comprising 4–70 wt. % $SiO_2$, 0.5–20 wt. % $Al_2O_3$, 0–20 wt. % $R_2O$, 0–30 wt. % R'O, 710–85 wt. % $Ta_2O_5$, 0–40 wt. % $Nb_2O_5$, and 0.01–1.0 wt. % $R''_2O_3$, wherein $R_2O+R'O$ is between about 2–35 wt. %, $Ta_2O_5+Nb_2O_5$ is between about 10–85 wt. %, R is selected from a group consisting of Li, Na, K, and combinations thereof, R' is selected from a group consisting of Ba, Sr, Ca, Mg, Zn, Pb, and combinations thereof, and R" is a rare earth element dopant in an optical component.

2. The glass of claim 1, further comprising 0–5 mole % of other oxides selected from a group consisting of CdO, $B_2O_3$, SnO, $TiO_2$, $ZrO_2$, $P_2O_5$, $Sb_2O_5$, $As_2O_5$, $Bi_2O_3$, and mixtures thereof.

3. The glass of claim 1, further comprising 0–35 mole % of an oxide selected a group consisting of $Y_2O_3$, $La_2O_3$, and mixtures thereof.

4. The glass of claim 1, further comprising 0–2.5 wt. % of one or more halides.

5. The glass of claim 4, wherein said halides are selected from a group consisting of $F^-$ and $Cl^-$.

6. The glass of claim 1, wherein $R_2O$ is replaced on a molar basis by up to one-third of $R'''_2O$, wherein R''' is selected from a group consisting of Rb and Cs.

7. The glass of claim 1, wherein $Al_2O_3$ is replaced on a molar basis by up to one-third of $Ga_2O_3$.

8. The glass of claim 1, comprising 20–60 wt. % $SiO_2$, 4–15 wt. % $Al_2O_3$, 2–5 wt. % $Li_2O$, 25–70 wt. % $Ta_2O_5$, and 0.1–0.5 wt. % $Er_2O_3$.

9. The glass of claim 1, comprising 25–55 wt. % $SiO_2$, 5–15 wt. % $Al_2O_3$, 3–20 wt. % R'O, 30–50 wt. % $Ta_2O_5$, 0.05–0.5 wt. % $Er_2O_3$, and 0.5–3 wt. % of one or more halides, wherein R' is selected from a group consisting of Ba, Sr, Ca, and combinations thereof.

10. The glass of claim 1, wherein $((Ta_2O_5+Nb_2O_5)/(R_2O+R'O))$ is between about 0.3 to 1.5.

11. The glass of claim 10, wherein $((Ta_2O_5+Nb_2O_5)/(R_2O+R'O))$ is between about 0.6 to 1.2.

12. The glass of claim 1, wherein R" is selected from a group consisting of Er, Pr, and Nd.

13. An optical amplifier having an amplifier core comprising the glass of claim 1.

14. An optical amplifier having an amplifier core comprising the glass of claim 8.

15. An optical amplifier having an amplifier core comprising the glass of claim 9.

16. A transparent glass ceramic matrix comprising 4–40 wt. % $SiO_2$, 1–15 wt. % $Al_2O_3$, 0–20 wt. % $K_2O$, 0–12 wt. % $Na_2O$, 0–5 wt. % $Li_2O$, 8–85 wt. % $Ta_2O_5$, and 0–45 wt. % $Nb_2O_5$, wherein $Ta_2O_5+Nb_2O_5$ is at least about 20 wt. %, $(K_2O+Li_2O+Na_2O)$ is between about 5–20 wt. %, and the matrix contains pyrochlore, perovskite, or a combination thereof as its major crystal phases and further comprising an oxide of a rare earth element selected from the group consisting of Y, La, Ce, Pr, Nd, Pm, Sm, Eu, Gd, Tb, Dy, Ho, Er, Tm, Yb and Lu as a dopant.

17. The matrix of claim 16, wherein the rare earth element is selected from a group consisting of Er, Pr, Eu, and Dy.

18. The matrix of claim 17, wherein the rare earth element is Er.

19. The matrix of claim 16, further comprising about 0.1 to 1.0 wt. % of a modifier selected from a group consisting of $As_2O_5$, $Sb_2O_3$, and F.

20. The matrix of claim 16, further comprising up to about 5.0 wt. % of an oxide selected from a group consisting of $TiO_2$, CdO, and ZnO.

21. The matrix of claim 16, wherein $(K^+/(K^++Li^+))$ is about 0.7 to 1.0.

22. The matrix of claim 21, wherein $(K^+/(K^++Li^+))$ is about 0.73 to 0.87.

23. The matrix of claim 16, wherein $(Na^+/(Na^++Li^+))$ is about 0.7 to 1.0.

24. The matrix of claim 23, wherein $(Na^+/(Na^++Li^+))$ is about 0.85 to 0.95.

25. The matrix of claim 16, wherein $Nb_2O_5$ is absent.

26. The matrix of claim 16, wherein $(Nb^{5+}/(Nb^{5+}+Ta^{5+}))$ is about 0.1 to 0.8.

27. The matrix of claim 26, wherein $(Nb^{5+}/(Nb^{5+}+Ta^{5+}))$ is about 0.2 to 0.5.

28. The matrix of claim 26, further comprising about 0.1 to 1.0 wt. % $As_2O_5$.

29. The matrix of claim 16, wherein the matrix has an average crystal size less than about 100 nm.

30. The matrix of claim 16, wherein the matrix has a dielectric constant of 12 to 45 at 100 KHz and a temperature between 20° C. to 25° C.

31. An optical filter having a filtering core comprising the transparent glass ceramic matrix of claim 16.

32. An optical filter having a filtering core comprising the transparent glass ceramic matrix of claim 18.

33. An electro-optical switch having a ferro-electric optical component comprising the transparent glass ceramic matrix of claim 16.

34. A method of making a transparent glass ceramic matrix comprising 4–40 wt. % $SiO_2$, 1–15 wt. % $Al_2O_3$, 0–20 wt. % $K_2O$, 0–12 wt. % $Na_2O$, 0–5 wt. % $Li_2O$, 710–85 wt. % $Ta_2O_5$, and 0–45 wt. % $Nb_2O_5$, wherein $Ta_2O_5+Nb_2O_5$ is at least about 20 wt. % and $(K_2O+Li_2O+Na_2O)$ is between about 5–20 wt. % and further comprising an oxide of a rare earth element selected from the group consisting of Y, La, Ce, Pr, Nd, Pm, Sm, Eu, Gd, Tb, Dy, Ho, Er, Tm, Yb and Lu as a dopant, said method comprising:

providing an admixture comprising glass forming components and crystal forming components;

melting the admixture at a temperature of from about 1300° C. to about 1650° C. for from about 2 to about 16 hours to produce a glass melt;

cooling the glass melt to produce a glass;

first heating the glass to a temperature of from about 650° C. to about 800° C. for from about 0.5 to about 4 hours to produce nucleated crystals within the glass; and second heating the nucleated glass to a temperature of from about 750° C. to about 1000° C. for from about 0.5 to about 4 hours to cause development of the nucleated crystals, thereby forming a transparent glass ceramic with pyrochlore, perovskite, or a combination thereof as its major crystal phases.

* * * * *

UNITED STATES PATENT AND TRADEMARK OFFICE
CERTIFICATE OF CORRECTION

PATENT NO. : 6,268,303
DATED : July 31, 2001
INVENTOR(S) : Aitken et al.

Page 1 of 1

It is certified that error appears in the above-identified patent and that said Letters Patent is hereby corrected as shown below:

<u>Column 23, claim 1,</u>
Line 62, "710-85 wt. %" should read -- > 10-85 wt. % --.
Line 65, "about 10-85 wt. %" should read -- about 10-85 wt. % --.

Signed and Sealed this

Sixteenth Day of April, 2002

Attest:

JAMES E. ROGAN
Attesting Officer    Director of the United States Patent and Trademark Office